(12) United States Patent
Danelski

(10) Patent No.: US 10,557,109 B1
(45) Date of Patent: Feb. 11, 2020

(54) INFUSION FILTER ARRANGEMENT WITH FORCED INFUSION SYSTEM FOR BEER-BREWING SYSTEM

(71) Applicant: Darin L. Danelski, Oconomowoc, WI (US)

(72) Inventor: Darin L. Danelski, Oconomowoc, WI (US)

( * ) Notice: Subject to any disclaimer, the term of this patent is extended or adjusted under 35 U.S.C. 154(b) by 780 days.

(21) Appl. No.: 15/046,705

(22) Filed: Feb. 18, 2016

Related U.S. Application Data

(60) Provisional application No. 62/118,085, filed on Feb. 19, 2015.

(51) Int. Cl.
  *C12C 7/06* (2006.01)
  *C12C 13/10* (2006.01)
(52) U.S. Cl.
  CPC ............... *C12C 7/06* (2013.01); *C12C 13/10* (2013.01)
(58) Field of Classification Search
  CPC .......... C12C 7/06; C12C 13/10; C12C 7/165; C12C 12/02; C12H 1/063; B01F 15/0219; B01F 15/00175; B01F 2015/0221
  USPC ...... 99/278, 325, 352, 276, 277, 277.1, 317, 99/319, 322; 426/115, 231; 222/638, 222/644, 144, 144.5, 145.1, 168.5, 222/181.1–181.3, 168, 333, 63, 52, 367, 222/370
  See application file for complete search history.

(56) References Cited

U.S. PATENT DOCUMENTS

| | | | | |
|---|---|---|---|---|
| 1,922,730 A * | 8/1933 | Gore | .................. | C12C 7/01 |
| | | | | 210/259 |
| 4,844,932 A * | 7/1989 | Daoud | .................. | C12C 7/16 |
| | | | | 426/489 |
| 8,481,100 B2 * | 7/2013 | Blichmann | .......... | C12C 13/10 |
| | | | | 426/29 |
| 9,228,163 B1 * | 1/2016 | Mitchell | .............. | C12C 13/10 |
| 2010/0032372 A1 * | 2/2010 | Adam | .................. | B01D 37/02 |
| | | | | 210/635 |
| 2015/0000532 A1 * | 1/2015 | Mitchell | .............. | C12C 1/02 |
| | | | | 99/276 |
| 2015/0322389 A1 * | 11/2015 | Anderson | ............ | A61B 50/10 |
| | | | | 99/276 |
| 2017/0130177 A1 * | 5/2017 | Geiger | .................. | C12C 1/02 |

* cited by examiner

*Primary Examiner* — Dana Ross
*Assistant Examiner* — Joseph W Iskra
(74) *Attorney, Agent, or Firm* — Boyle Fredrickson, S.C.

(57) ABSTRACT

The present invention is directed to an infusion filter arrangement with a forced infusion system for a beer-brewing system that is configured to create a liquid flow in a grain bed that provides self-agitation of the grains by delivering liquid inside of or below the grain bed from an intermediate segment of a filter cavity.

17 Claims, 25 Drawing Sheets

| BREW-BOSS AUTOMATED BREW CONTROLLER | | | | | | | | |
|---|---|---|---|---|---|---|---|---|
| STEP TYPE | PROMPT | SETPOINT | STEP TIMER | BOIL FLAG | PUMP FLAG | HOPS POS | SPEAK | ALARM FLAG |
| 1 | FILL KETTLE WITH WATER | 0 | 0 | 0 | 0 | 0 | 1 | 0 |
| 1 | PLACE COVER ON KETTLE AND THEN OPEN THE VALVE | 0 | 0 | 0 | 0 | 0 | 1 | 0 |
| 3 | HEATING WATER TO STRIKE TEMPERATURE OF 154 DEGREES | 154 | 0 | 0 | 0 | 0 | 1 | 0 |
| 1 | WATER AT STRIKE TEMPERATURE PLEASE CLOSE VALVE AND ADD GRAINS | 152 | 0 | 0 | 1 | 0 | 1 | 1 |
| 1 | PLACE COVER ON KETTLE AND THEN OPEN THE VALVE | 152 | 0 | 0 | 0 | 0 | 1 | 0 |
| 3 | HEATING TO MASH TEMPERATURE OF 152 DEGREES FOR FIRST MASH STEP | 152 | 0 | 0 | 0 | 0 | 1 | 0 |
| 4 | MAINTAINING MASH TEMPERATURE OF 152 DEGREES FOR FIRST MASH STEP | 152 | 60 | 0 | 1 | 0 | 1 | 0 |
| 3 | HEATING TO MASH OUT TEMPERATURE OF 168 DEGREES | 168 | 0 | 0 | 1 | 0 | 1 | 0 |
| 4 | MAINTAINING MASH OUT TEMPERATURE OF 168 DEGREES | 168 | 15 | 0 | 1 | 0 | 1 | 0 |
| 1 | MASH OUT COMPLETE PLEASE CLOSE THE VALVE AND REMOVE COVER | 168 | 0 | 0 | 0 | 1 | 1 | 1 |
| 1 | PLEASE REMOVE THE GRAIN BAG AND INSTALL THE AUTOMATIC HOPS FEEDER | 220 | 0 | 1 | 0 | 0 | 1 | 0 |
| 1 | PLEASE ADD YOUR HOPS TO THE FEEDER IN THE APPROPRIATE POSITIONS. | 220 | 0 | 1 | 0 | 0 | 1 | 0 |

FIG. 17

| BREW-BOSS AUTOMATED BREW CONTROLLER | | | | | | | | |
|---|---|---|---|---|---|---|---|---|
| STEP TYPE | PROMPT | SETPOINT | STEP TIMER | BOIL FLAG | PUMP FLAG | HOPS POS | SPEAK | ALARM FLAG |
| 1 | MASH OUT COMPLETE. PLEASE CLOSE THE VALVE AND REMOVE COVER | 168 | 0 | 0 | 0 | 0 | 1 | 1 |
| 1 | PLEASE REMOVE THE GRAIN BAG AND INSTALL THE AUTOMATIC HOPS FEEDE | 220 | 0 | 1 | 0 | 0 | 1 | 0 |
| 1 | PLEASE ADD YOUR HOPS TO THE FEEDER IN THE APPROPRIATE POSITIONS. | 220 | 0 | 1 | 0 | 0 | 1 | 0 |
| 3 | HEATING WORT TO BOIL | 220 | 0 | 1 | 0 | 0 | 1 | 0 |
| 2 | BOILING STATE REACHED. ADDING BOILING HOPS | 220 | 0 | 1 | 0 | 1 | 1 | 1 |
| 4 | MAINTAINING BOIL | 220 | 45 | 1 | 0 | 1 | 1 | 0 |
| 2 | ADDING FINISHING HOPS AND IRISH MOSS | 220 | 0 | 1 | 0 | 3 | 1 | 1 |
| 4 | MAINTAIN BOIL | 220 | 15 | 1 | 0 | 3 | 1 | 0 |
| 1 | ADD CHILLER TO KETTLE | 70 | 0 | 0 | 0 | 0 | 1 | 1 |
| 1 | PLACE COVER AND OPEN VALVE | 70 | 0 | 0 | 1 | 0 | 1 | 1 |
| 4 | RECIRCULATE | 70 | 15 | 0 | 0 | 0 | 1 | 0 |
| 2 | BREWING COMPLETE. CHILL WORT TRANSFER TO PRIMARY FERMENTER THAN A | 0 | 0 | 0 | 0 | 0 | 1 | 1 |

FIG. 18

| BREW-BOSS AUTOMATED ELECTRIC BREW CONTROLLER V1.20 | |
|---|---|
| OPERATIONAL PARAMETERS (CLICK ON A PARAMETER TO CHANGE) | |
| PARAMETER | VALUE |
| WIFI INSTALLED | ☑ YES |
| IP ADDRESS OF BREW-BOSS CONTROLLER | 192.168.11.254 |
| TCP/IP PORT FOR BREW-BOSS CONTROLLER | 8080 |
| TEMP UNITS | ⊙C ○C |
| ENABLE HOPS-BOSS AUTOMATIC HOPS FEEDER | ☐ YES |
| IP ADDRESS OF HOPS-BOSS CONTROLLER | 192.168.11.253 |
| TCP/IP PORT FOR HOPS-BOSS CONTROLLER | 8081 |
| ENABLE HOT BREAK DETECT ON HOPS-BOSS CONTROLLER | ☐ YES |
| HOT BREAK THRESHOLD VALUE (1-1023) | 900 |
| ENABLE OPTIONAL ANALOG INPUT ON HOPS-BOSS | ☐ YES |
| ANALOG INPUT MINIMUM VALUE | 0 |
| ANALOG INPUT MAXIMUM VALUE | 100 |
| BREW MODE | ⊙AUTO ○MANUAL |
| BOIL DETECT TIME | 3 |
| SLOW POWER WITHIN DELTAT1 – PWRS | 75 |
| LOW POWER WITHIN DELTAT2 – PWRL | 50 |
| MAINTAIN POWER – PWRM | 30 |

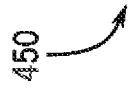

FIG. 19

INFUSION FILTER ARRANGEMENT WITH FORCED INFUSION SYSTEM FOR BEER-BREWING SYSTEM

CROSS-REFERENCE TO RELATED APPLICATION

This application claims priority from U.S. Provisional Patent Application No. 62/118,085, which was filed on Feb. 19, 2015, the subject matter of which is incorporated by reference in its entirety.

BACKGROUND OF THE INVENTION

1. Field of the Invention

This invention relates generally to beer-brewing systems. More particularly, the present invention is an infusion filter arrangement with a forced infusion system for a beer-brewing system.

2. Discussion of the Related Art

Home and small-scale craft brewing is getting increasingly popular. But brewing can at times be frustrating because it is time-consuming and complex, requiring completely and accurately following complex recipes. This typically includes manually using and closely watching numerous pieces of brewing equipment and accessories, which require corresponding technical competence. Mashing procedures can be challenging because they can require manual stirring and spraying hot water on top of the mash to gravity feed through the mash while sparging after mashing.

SUMMARY OF THE INVENTION

The present invention is directed to an infusion filter arrangement with a forced infusion system for a beer-brewing system that is configured to create a liquid flow in a grain bed that provides self-agitation of the grains. This may reduce the complexity of brewing by eliminating the need to stir the grains in the grain bed.

According to one aspect of the invention, the infusion filter arrangement for use with a kettle of a beer-brewing system may include a filter body. The filter body may be configured to be placed in a brewing kettle during a mash cycle and have perforated outer walls defining a filter cavity configured to hold grains defining a grain bed in the filter cavity during the mash cycle. A forced infusion system of the infusion filter arrangement may include an infusion liquid delivery system configured to release water or wort out of the infusion liquid delivery system at a location relative to the grain bed for establishing a flow of the water or wort through the grain bed that agitates the grains in the grain bed.

According to another aspect of the invention, the infusion liquid delivery system may include a delivery tube that extends through an intermediate segment of the filter cavity and releases the water or wort relative to the intermediate segment of the grain bed to establish the flow of the water or wort through the grain bed. The delivery tube may release the water or wort at a location within the grain bed.

According to another aspect of the invention, the delivery tube may define an infusion tube extending longitudinally into the intermediate segment of the filter cavity. The infusion tube may have an inlet receiving water or wort during the mash cycle and multiple outlets facing multiple directions delivering water or wort out of the infusion tube from the intermediate segment of the filter cavity outwardly through the filter cavity during the mash cycle. The infusion tube may establish an inside-to-outside flow direction of the water or wort through the filter body during the mash cycle. The infusion tube may be arranged generally vertically within the filter cavity. The inlet of the infusion tube may be arranged at an upper end of the infusion tube, and the multiple outlets may be arranged at different heights upon, and face radially away from, the infusion tube.

According to another aspect of the invention, multiple infusion tubes may extend longitudinally into the intermediate segment of the filter cavity. Each of the multiple infusion tubes may be arranged generally vertically within the filter cavity.

According to another aspect of the invention, the delivery tube releases the water or wort at a location below the grain bed for delivery upwardly through the grain bed. The delivery tube is configured to deliver the water or wort through multiple outlets arranged at the location below the grain bed for delivery upwardly through the grain bed. A coupling may be arranged at an end of the delivery tube and the multiple outlets may be arranged at the coupling with the outlet facing radially away from the delivery tube.

According to another aspect of the invention, a mash plate assembly may be arranged below the grain bed within the filter cavity of the filter body. The water or wort may be delivered out of the delivery tube at the mash plate assembly. The mash plate assembly may include a solid bottom wall and a perforated top wall spaced from the bottom wall with a mash plate assembly cavity defined between the solid bottom wall and the perforated top wall. The water or wort may be released from the delivery tube into the mash plate assembly cavity and be directed through the perforated top wall and through the grain bed.

According to another aspect of the invention, a beer-brewing system is provided that includes a brewing kettle, a heating system for heating the brewing kettle, a recirculation system for moving liquid contents through the brewing kettle, and an infusion filter arrangement for delivering water or wort within the brewing kettle. The infusion filter arrangement may include a filter body configured to be placed in the brewing kettle during a mash cycle. The filter body may have perforated outer walls defining a filter cavity configured to hold grains defining a grain bed in the filter cavity during the mash cycle. A delivery tube may extend through an intermediate segment of the filter cavity for directing water or wort into the brewing kettle. The delivery tube may be configured to release the water or wort relative to the intermediate segment of the grain bed to establish the flow of the water or wort through the grain bed.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIGS. 17-25 are various representations of screenshots of a graphical user interface while performing the method of FIG. 16.

DETAILED DESCRIPTION OF THE INVENTION

Figure 1:
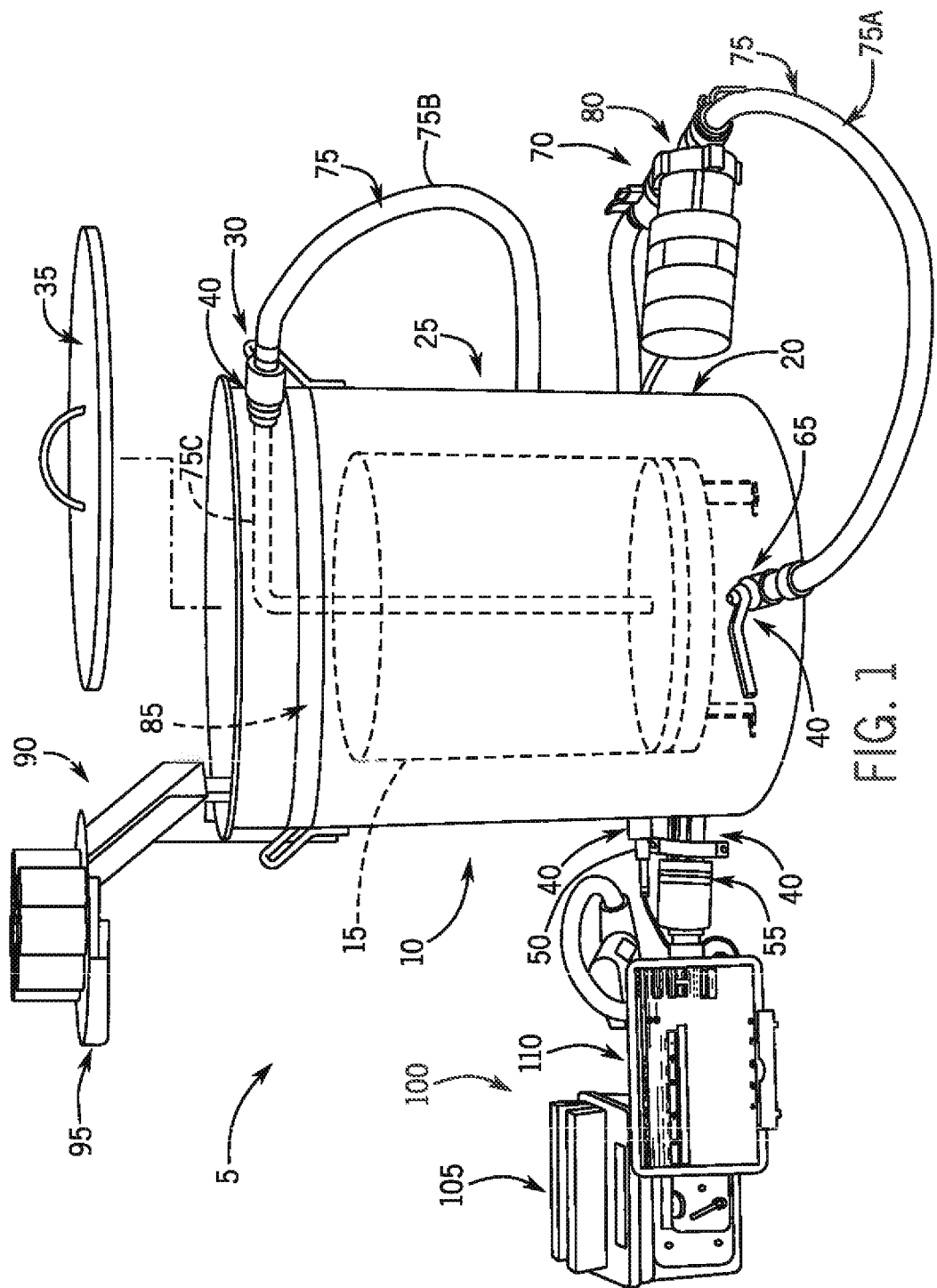
FIG. 1 is a partially schematic side elevation view of an automated beer-brewing system incorporating an infusion filter arrangement in accordance with the present invention.

Specific embodiments of the present invention will be described by the following non-limiting examples which will serve to illustrate various features of the invention. With reference to the drawing figures in which like reference numerals designate like parts throughout the disclosure, a representative embodiment of the present invention is incorporated in an automated beer-brewing system, shown as system 5. System 5 automates brewing procedures to allow for quick brewing processes while producing predictable and repeatable results. System 5 includes a brewing kettle 10 and is shown configured as a single-kettle system 5 allowing for a brew-in-bag-type process, although it is understood that system 5 can be implemented with multiple kettles 10 to perform the brewing process. It is also understood that the invention need not be incorporated as the entire system 5, but may instead be incorporated as one or more of the various components or features of system 5, on their own and/or as a retrofitting kit(s) for existing beer brewing systems.

Still referring to FIG. 1, kettle 10 has an open space defining a kettle cavity 15 in which the brewing process is performed. Kettle 10 has a closed lower end 20, a circumferential side wall 25, and an open upper end 30 that can be selectively closed by lid 35. Fittings 40 are attached to the kettle 10 at different locations to facilitate connecting various accessories to the kettle 10. The fittings 40 include various weldless threaded or compression-type sealed fittings, weldable tri-clover ferrules, and other weldable fittings of types selected to correspond to the accessory they receive. At the lower end 20 of kettle 10, components of a temperature regulating system 45 are mounted to the kettle 10, including a temperature sensor probe 50 and a heating element 55 that connect to fittings 40 and extend into the kettle cavity 15 for respectively sensing and controlling temperature by heating within the kettle cavity 15. A shutoff valve 65 is attached to a fitting 40 at the lower end 20 of kettle 10 that selectively permits liquid to flow through a recirculation system 70. Although shutoff valve 65 is shown as a manually actuated valve, it is understood that the shutoff valve 65 may be a solenoid or otherwise actuated valve automatically controlled by system 5. Hoses or tubes 75 of the recirculation system 70 direct liquid out of and back into the kettle cavity 15, as explained in greater detail elsewhere herein. Tubes 75 include an outlet tube 75A that is connected to shutoff valve 65 at the lower end 20 of kettle 10 to receive liquid discharged from the kettle cavity 15. Inlet tube 75B is connected to a fitting 40 at the upper end 30 of kettle 10 to deliver liquid into the kettle cavity 15. Pump 80 of the recirculation system 70 interconnects the outlet and inlet tubes 75A, 75B while drawing, by vacuum pressure, liquid out of the kettle cavity 15 through the outlet tube 75A and delivering, by positive pressure, the liquid back into the kettle cavity 15 through the inlet tube 75B. A filter connecting tube 75C of the recirculation system 70 extends from the inlet tube 75B to deliver the liquid into the kettle cavity 15, which may be done by way of an infusion filter arrangement 85, as explained in greater detail elsewhere herein.

Still referring to FIG. 1, an ingredient-dispensing arrangement 90 is configured to automatically feed hops and/or any other ingredient, e.g. finings such as Irish Moss, at specific predetermined times by controlling a drive 95 as controlled by a control system 100, as explained in greater detail elsewhere herein. In addition to controlling the ingredient-dispensing arrangement 90, control system 100 is operably connected to and controls the temperature regulating system 45 and recirculation system 70 by way of a control module 105 and a control interface 110 that is operably connected to control module 105, such as by way of Wi-Fi or another wireless connection. This allows control system 100 to control temperature, circulation, and timing of events during the brewing process. The control module 105 includes a microprocessor-based controller that is configured to facilitate control of the heating element(s) 55, pump(s) 80, and drive 95 of the ingredient-dispensing arrangement 90. Control module 105 is operably connected to the heating element(s) 55 and pump(s) 80 with conductors, and communicates wirelessly with the drive 95 of the ingredient-dispensing arrangement 90 as well as the control interface 110. The control interface 110 may be a standalone computing device such as a laptop or tablet computer. Control system 100 may be configured with the instructions generated at the control interface 110 through a memory-stored application or other program of the control interface 110 so that the control module 105 receives instructions from the control interface 110, performs the corresponding control tasks to the heating element(s) 55, pump(s) 80, and drive 95, and provides status information of the various components of the system 5 back to the application on the control interface 110. It is understood that the control module 105 may instead store the control application program, whereby the control module 105 performs the computing and control functions itself while the control interface 110 is used primarily or solely for conveying information to a user and receiving user inputs.

Figure 2:
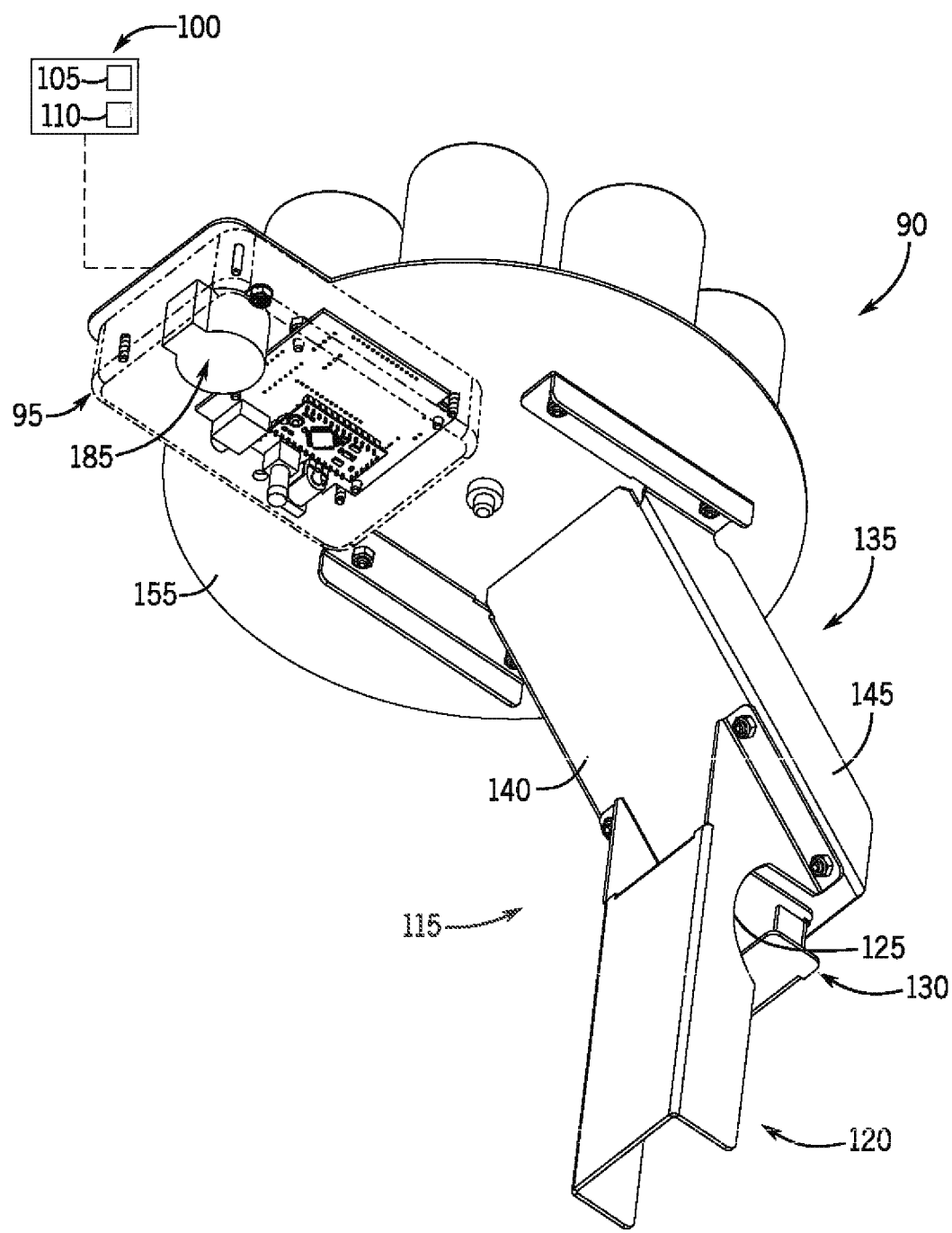
FIG. 2 is a pictorial view from below of the ingredient-dispensing arrangement such as of the type illustrated in FIG. 1.
Figure 3:
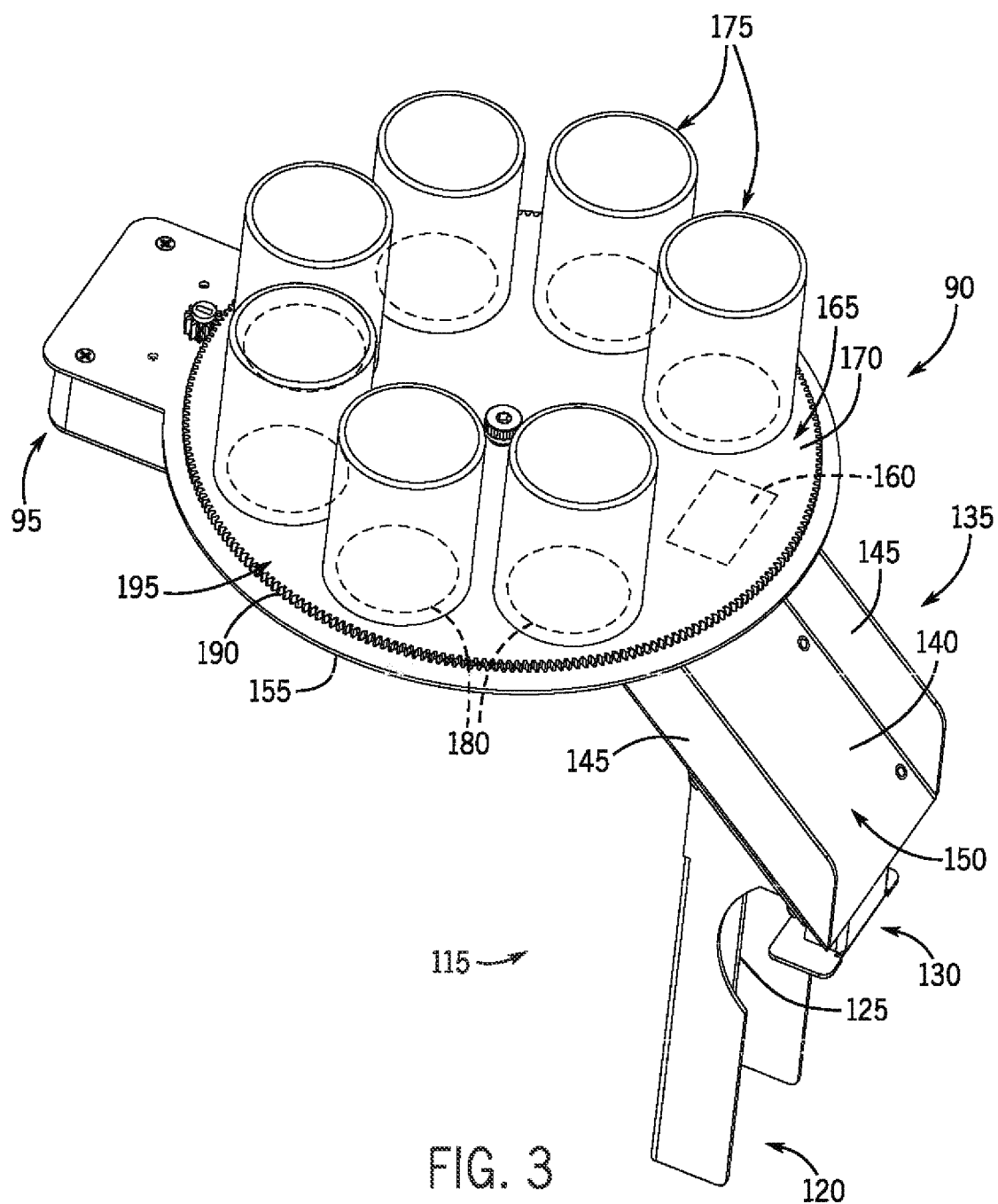
FIG. 3 is a pictorial view from above of the ingredient-dispensing of FIG. 2.
Figure 4:
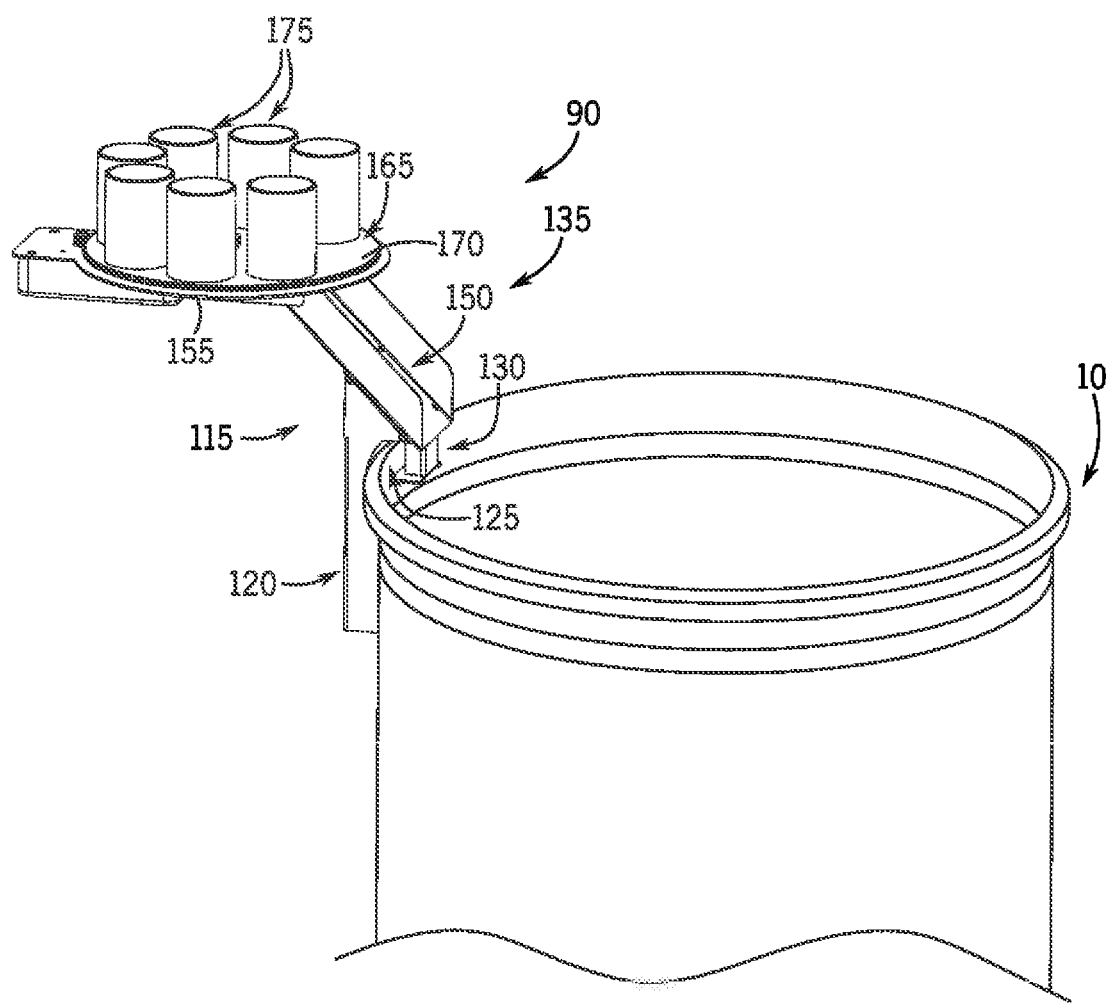
FIG. 4 is a pictorial view of the ingredient-dispensing arrangement of FIG. 2 mounted on a brewing kettle.

Referring now to FIGS. 2-3, a bracket 115 supports ingredient-dispensing arrangement 90 from the upper end 30 of kettle 10. Bracket 115 has a lower bracket leg 120 with a recess 125 and a post 130 extending downwardly parallel to lower bracket leg 120 and inwardly of recess 125. Referring now to FIG. 4, the recess 125 defines a channel between lower bracket leg 120 and post 130 and receives a lip such as an upper lip of the upper end 30 of kettle 10 sandwiched between lower bracket leg 120 and post 130. Referring again to FIGS. 2-3, an upper bracket leg 135 extends from an upper end of lower bracket leg 120 and includes a lower wall 140 and a pair of side walls 145 that extend from outer segments of the lower wall 140 to define an open-channel chute 150 (FIG. 3) that extends from a base plate 155 of ingredient-dispensing arrangement 90 to kettle 10 (FIG. 4) for guiding the delivered hops or other ingredients from the ingredient-dispensing arrangement 90 to the interior of the kettle 10. Upper bracket leg 135 is shown extending angularly upwardly away from the upper end 30 of kettle 10 so that the ingredient-dispensing arrangement 90 is cantilevered higher than and outwardly of the upper end 30 of kettle 10. Referring now to FIG. 3, a base plate opening 160 extends through base plate 155 at a portion of the base plate 155 that is opposite drive 95, directly over an upper end of the chute 150. Base plate 155 and bracket 115 define stationary portions of the ingredient-dispensing arrangement 90 that can removably engage the kettle 10 for supporting the ingredient-dispensing arrangement 90, including movable portions of the ingredient-dispensing arrangement 90 such as a carrier arrangement 165.

Referring now to FIGS. 3-4, the carrier arrangement 165 carries the hops or other ingredients and is supported by and mounted for movement with respect to base plate 155 to allow delivery of the hops or other ingredients. Carrier arrangement 165 includes a carrier plate 170 and at least one container configured to hold the hops or other ingredients, shown here as multiple containers 175. Referring now to FIG. 3, each container 175 overlies a carrier plate opening 180 that extends through carrier plate 170. Alignment of one of the carrier plate openings 180 with base plate opening 160 defines a release position of the respective container(s) 175 that allows release of the hops or other ingredients from the respective container 175. Selective alignment of the carrier plate opening(s) 180 with base plate opening 160 is done by way of the drive 95. Referring now to FIGS. 2-3, drive 95 has a motor 185 (FIG. 2) with a gear mounted to its output shaft that engages and drives a toothed outer circumferential surface 190 (FIG. 3) of a carrier gear 195 defined by carrier plate 170.

Figure 5:
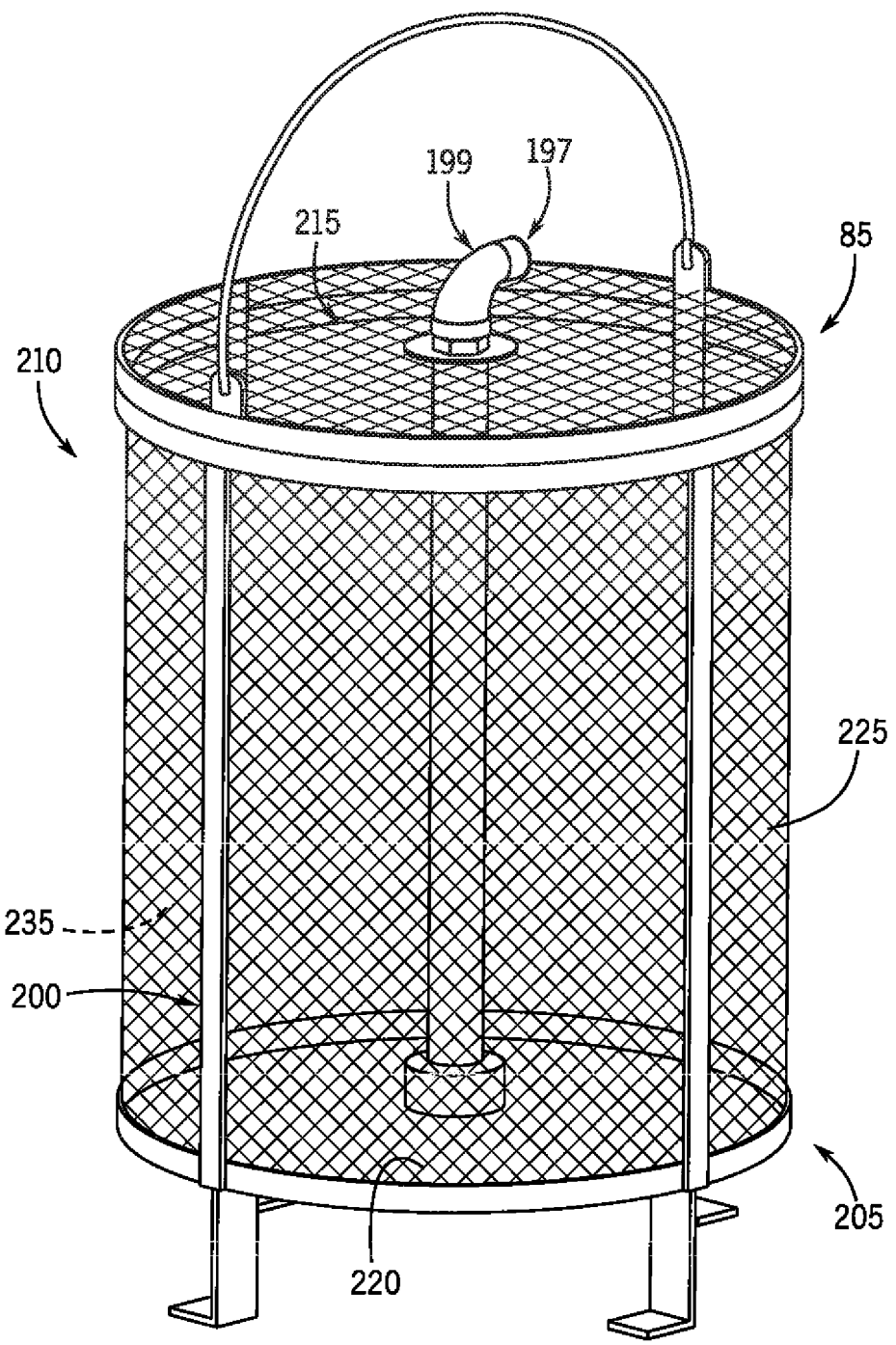
FIG. 5 is a pictorial view of an infusion filter arrangement such as of the type illustrated in FIG. 1.
Figure 6:
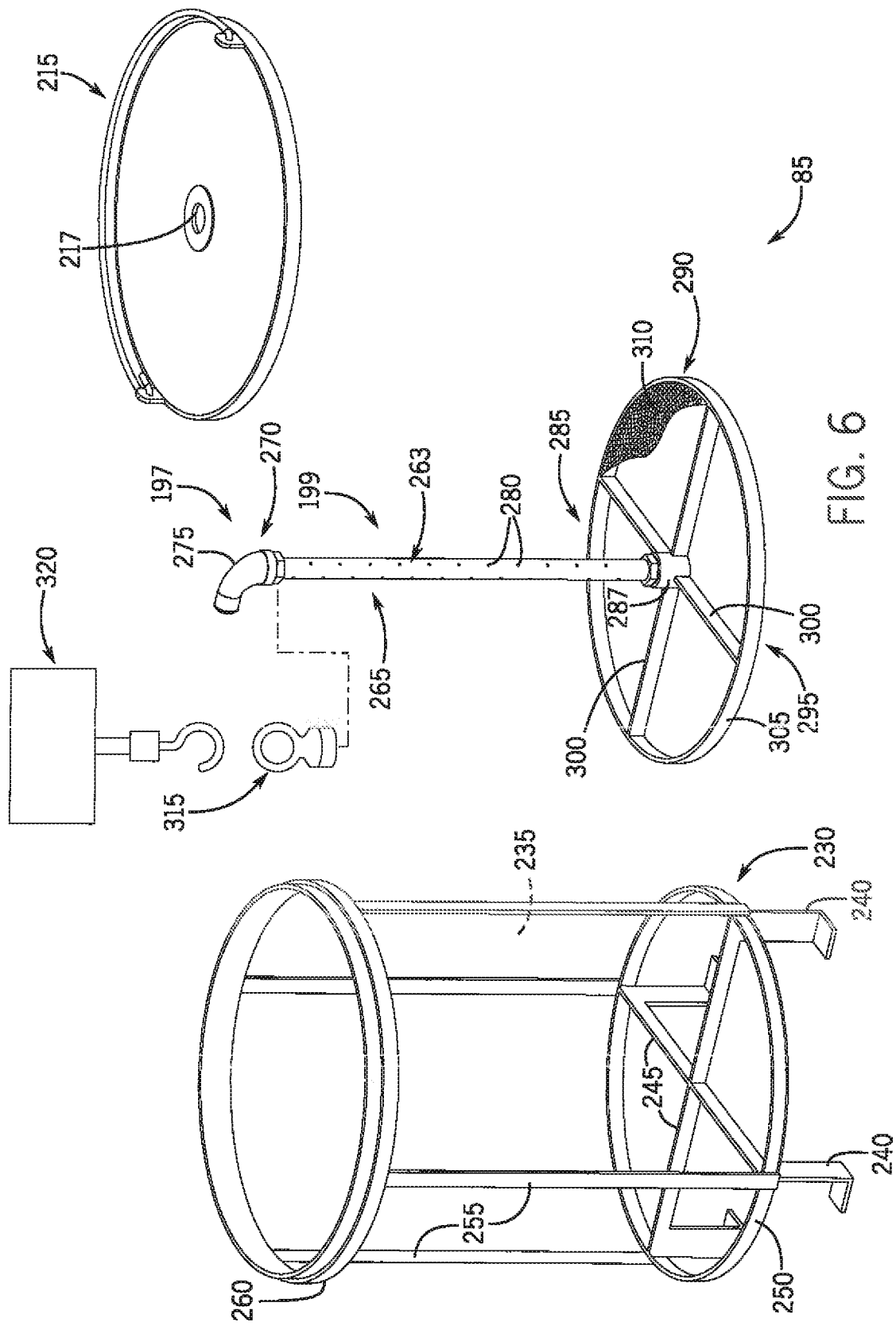
FIG. 6 is a pictorial view of various frame components of the infusion filter arrangement such as of the type illustrated in FIG. 1.

Referring now to FIG. 5, infusion filter arrangement 85 has a forced infusion system 197 with an infusion liquid delivery system 199 for delivering liquid such as water or wort through a filter body 200 that is placed in kettle cavity 15 (FIG. 1) during a mash cycle of the brewing process to establish a turbulent flow through a grain bed in the filter body 200. This provides self-agitation of the grains of the grain bed in the filter body 200, eliminating a need to stir the grains, as explained in greater detail elsewhere herein. Filter body 200 has a lower end 205, an upper end 210, and a filter cover 215 removably attached to upper end 210 of filter body 200 and having at least one opening 217 through which various components of the infusion filter arrangement 85 extend, as explained in greater detail elsewhere herein. Interconnected perforated walls of the filter body 200 include a lower wall 220 and a circumferential side wall 225. The perforated lower and circumferential side walls 220, 225 (FIG. 5) can be made from a metallic mesh material that is supported by a filter frame 230 (FIG. 6) and collectively surround a filter cavity 235. FIG. 6 shows filter frame 230 without its surrounding perforated or mesh lower and side walls 220, 225 for ease of illustration of view of the various components. Filter frame 230 includes feet 240 that hold lower wall 220 (FIG. 5) of the filter body 200 spaced from a bottom wall at the lower end 20 of kettle 10 (FIG. 1). Referring now to FIG. 6, a series of interconnected lower wall cross-members 245 and a lower hoop 250 are connected to feet 240. Side wall upright supports 255 extend between and connect lower hoop 250 to an upper hoop 260.

Figure 7:
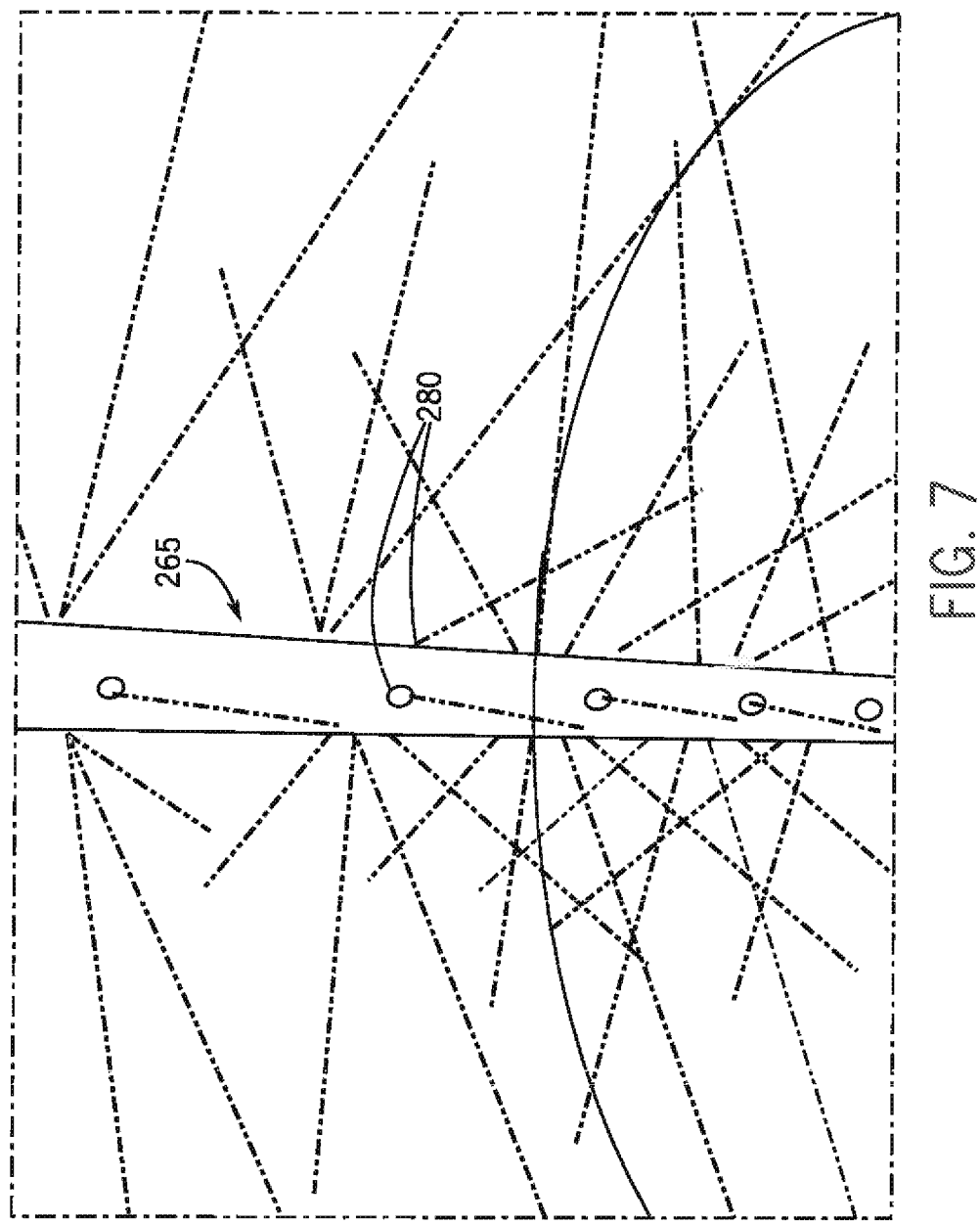
FIG. 7 is a pictorial view of an infusion tube such as of the type illustrated in FIG. 6.
Figure 8:
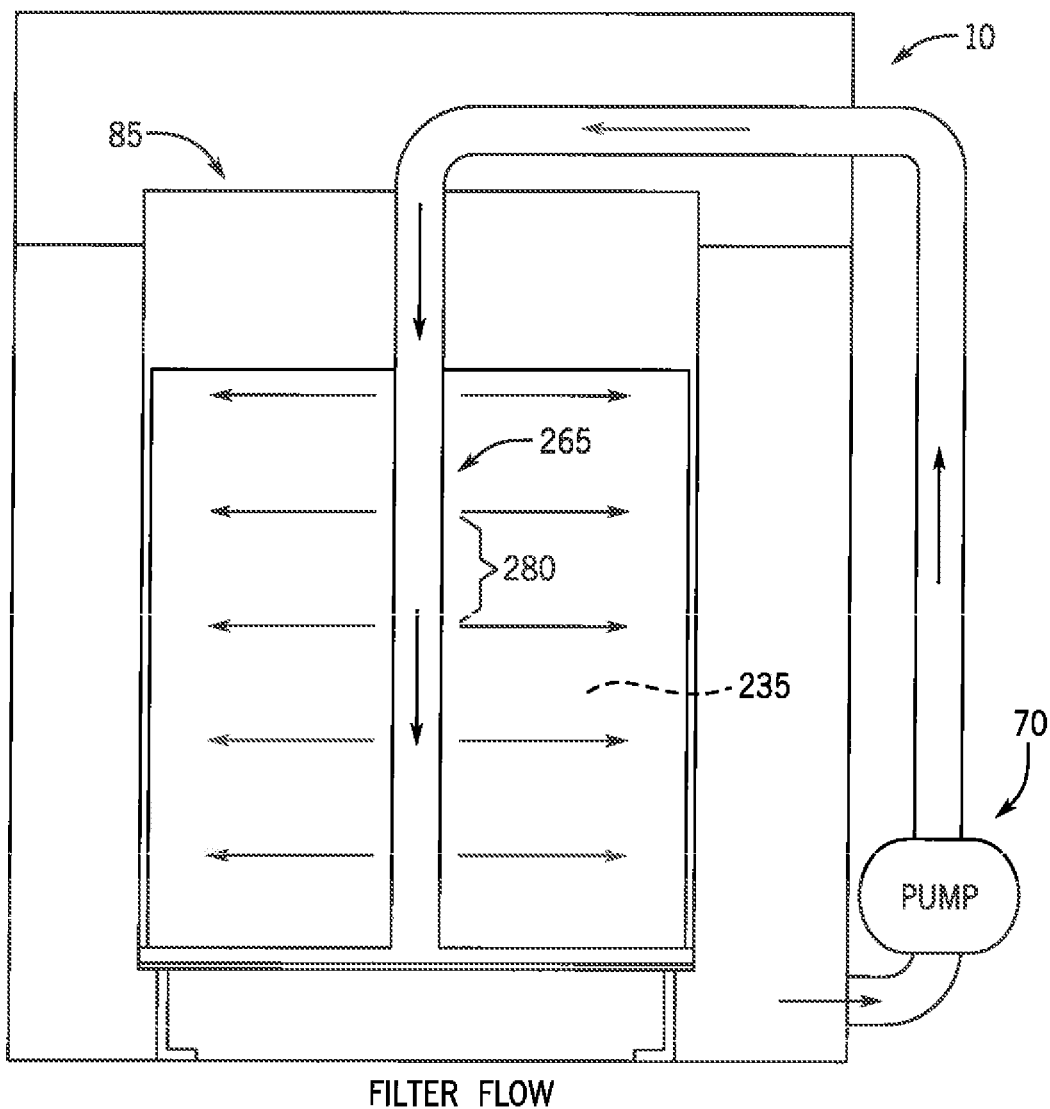
FIG. 8 is a simplified schematic representation of a cross-sectional view of an infusion tube such as of the type illustrated in FIG. 6 delivering water through a grain bed.

Still referring to FIG. 6, forced infusion system 197 is shown with an infusion liquid delivery system 199 having a delivery tube 263 shown as an infusion tube 265 that extends through opening 217 of filter cover 215 and longitudinally into an intermediate segment of filter cavity 235 (FIG. 5). Inlet 270 of delivery tube 263, such as infusion tube 265, includes an elbow 275 that is connected to a filter connecting tube 75C (FIG. 1) of the recirculation system 70 to deliver the recirculated liquid through infusion tube 265. Referring now to FIG. 7, the liquid exits infusion tube 265 through multiple outlets 280 arranged at different heights upon and faced radially away from infusion tube 265 at multiple locations within the grain bed, which establishes a flow through the grain bed that agitates the grains in the grain bed. Referring now to FIG. 8, the arrangement of outlets 280 forces the liquid out of the infusion tube 25 from a center or intermediate segment of filter cavity 235, outwardly through filter cavity 235 (FIG. 5). In this way, during the mash cycle, the recirculation system 70 and infusion tube 265 establish an inside-to-outside radial flow direction of a flow path of the water or wort through the filter body 200.

Figure 9:
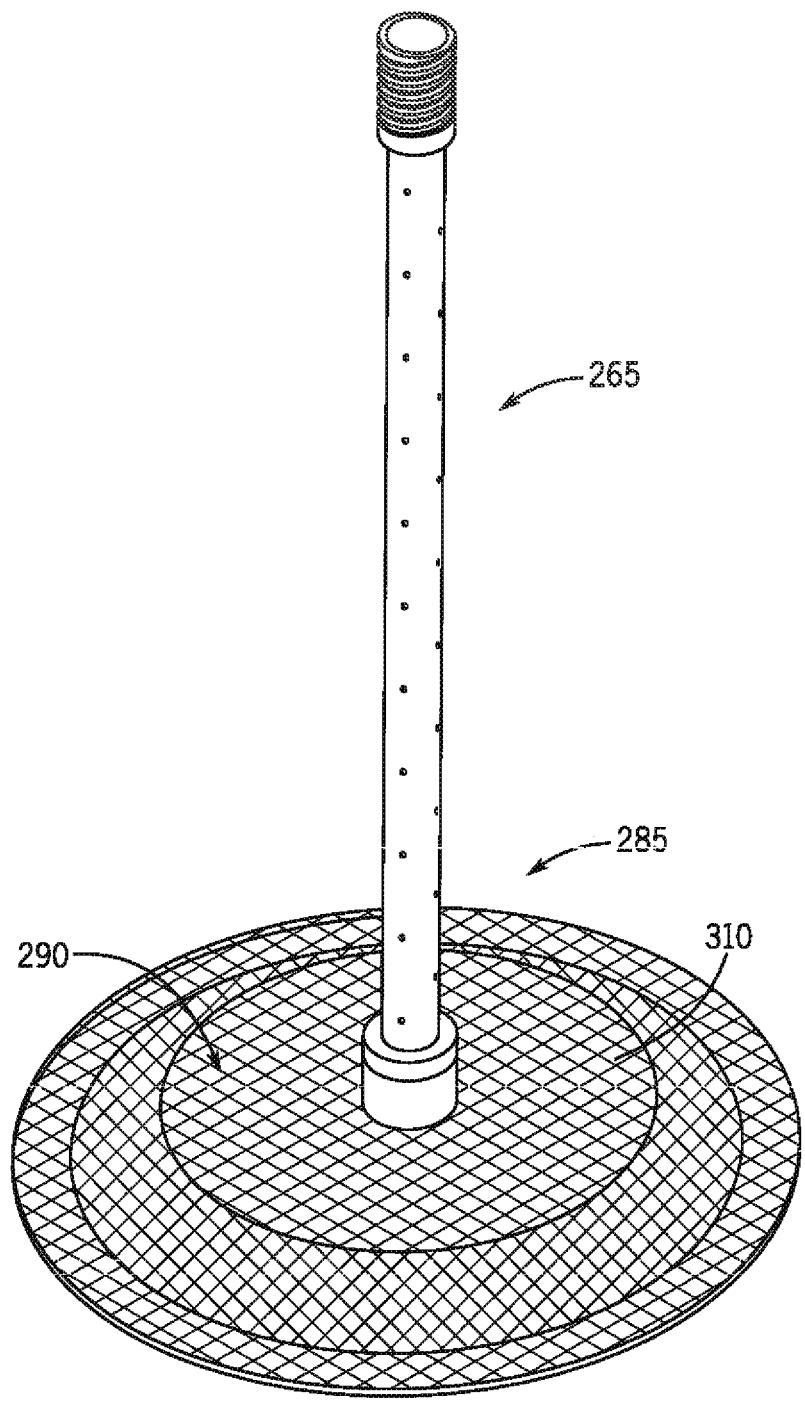
FIG. 9 is pictorial view of an infusion tube and false bottom such as of the type illustrated in FIG. 6.
Figure 10:
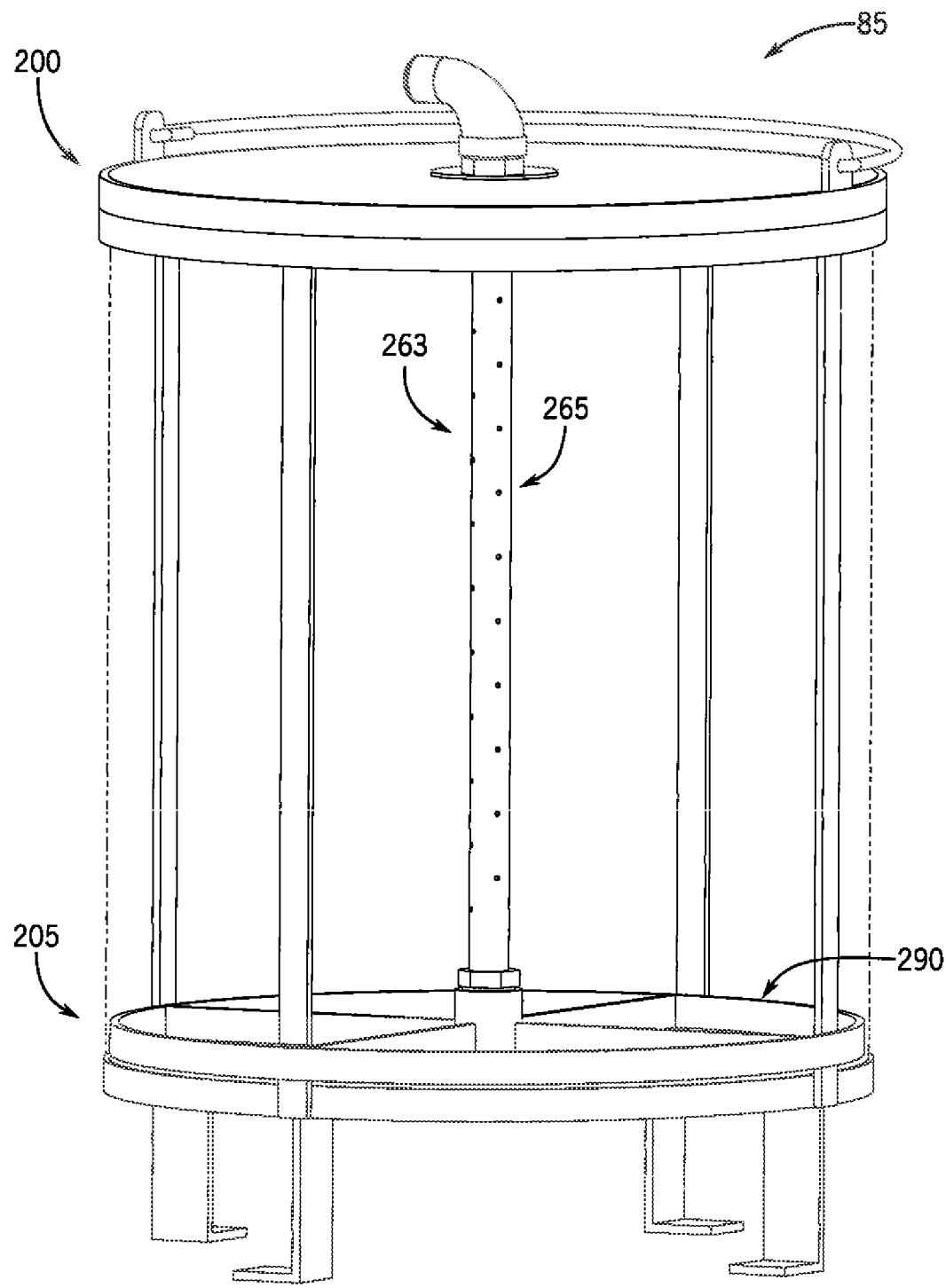
FIG. 10 is a pictorial view of an infusion tube and false bottom such as of the type illustrated in FIG. 6 in a mashing position.
Figure 11:
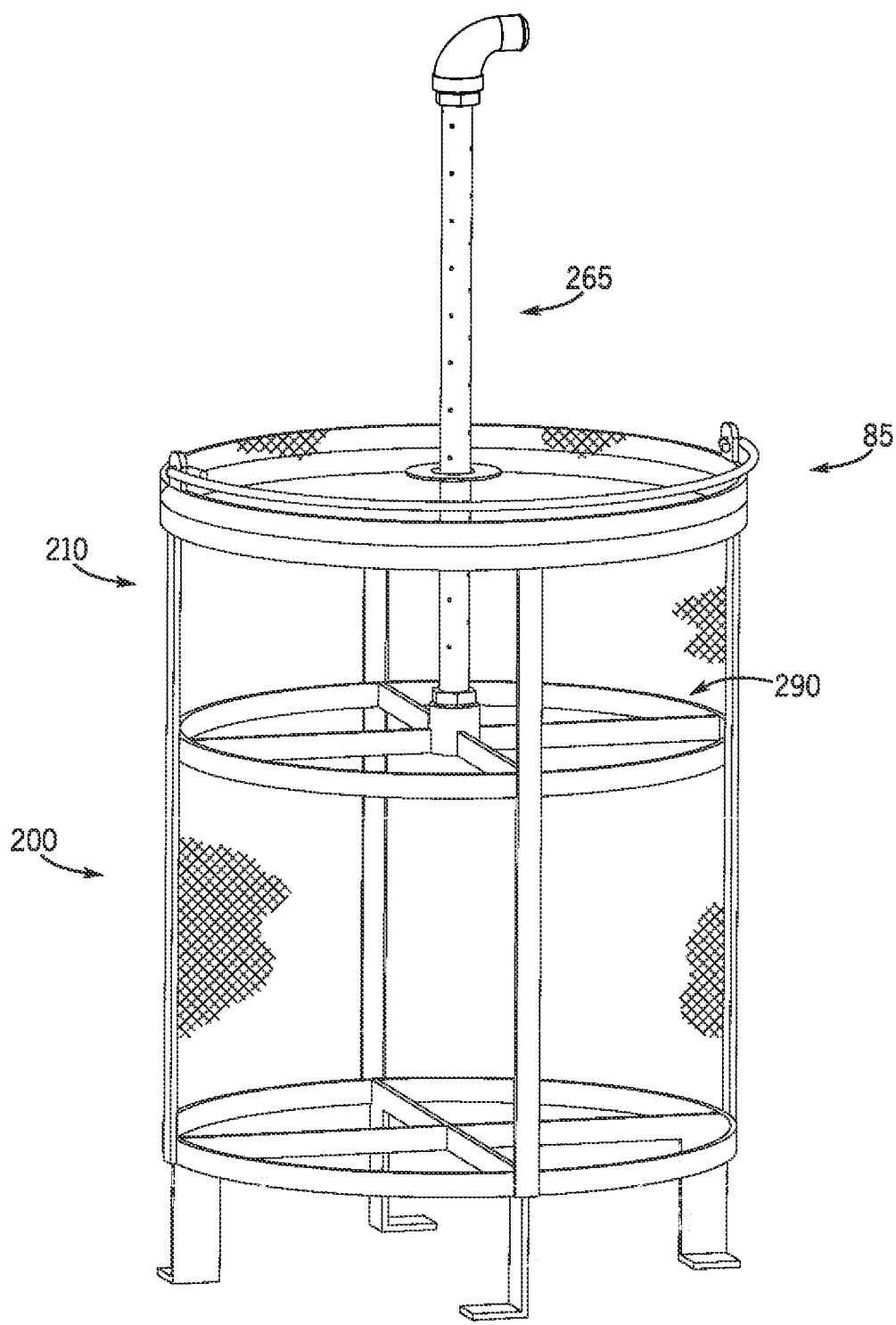
FIG. 11 is a pictorial view of an infusion tube and false bottom such as of the type illustrated in FIG. 6 in a squeezing position.
Figure 12:
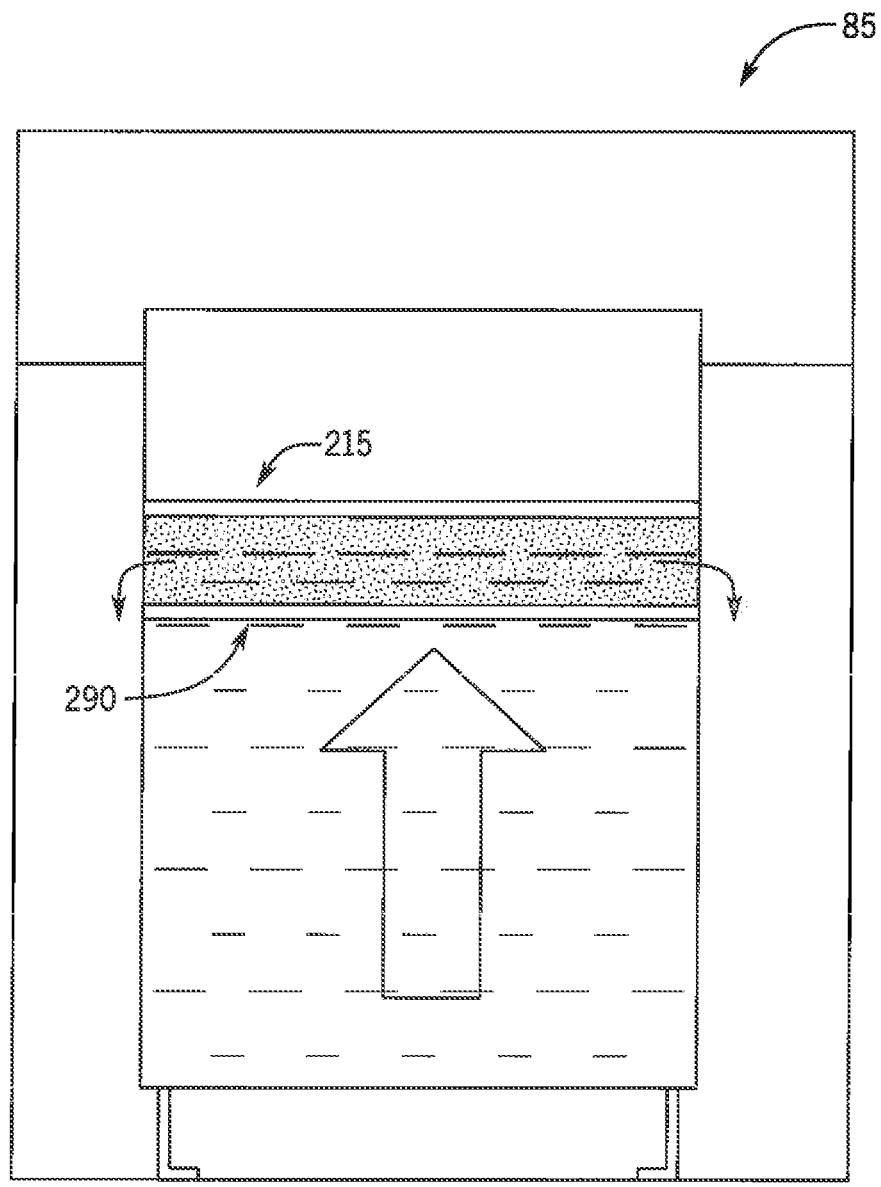
FIG. 12 is a side elevation view of the infusion tube and false bottom of FIG. 11 in a squeezing position squeezing a grain bed.

Referring now to FIGS. 6 and 9, lower end 285 of delivery tube 263, such as infusion tube 265, connects to a false bottom 290 of infusion filter arrangement 85, whereby the infusion tube 265 is shown defining a lift element extending from the false bottom through filter cover 215, although it is understood that the lift element may be a separate component from infusion tube 265. Referring now to FIG. 6, false bottom 290 includes a false bottom frame 295 with interconnected false bottom cross-members 300 and a false bottom hoop 305 that are connected to the infusion tube 265 lower end 285. This may be done by way of threaded or other connection of the infusion tube 265 lower end 285 to a coupling 287 that defines a collar that extends upwardly from the intersection of the false bottom cross-members 300. A perforated false bottom wall 310 that can be made from a metallic mesh material covers the false bottom frame 295. By moving infusion tube 265 upwardly, false bottom 290 can be moved upwardly through filter cavity 230. To facilitate moving false bottom 290 through filter cavity 235, elbow 275 can be removed and replaced with a lift eye 315. Thus, by lifting the lift eye 315 by way of a cable or rope connected to a lifting device 320 such as a winch, false bottom 290 can be moved from a mashing position at the lower end 205 of filter body 200 during the mash cycle as shown in FIG. 10 to a squeezing position at the upper end 210 of the filter body 200 as shown in FIG. 11 after completion of the mash cycle. As shown in FIG. 12, in the squeezing position, false bottom 290 squeezes the grain between the false bottom 290 and the filter cover 215 to extract wort from the grain and release the extracted wort through the filter body 200 and thus into the kettle 10.

Figure 13:
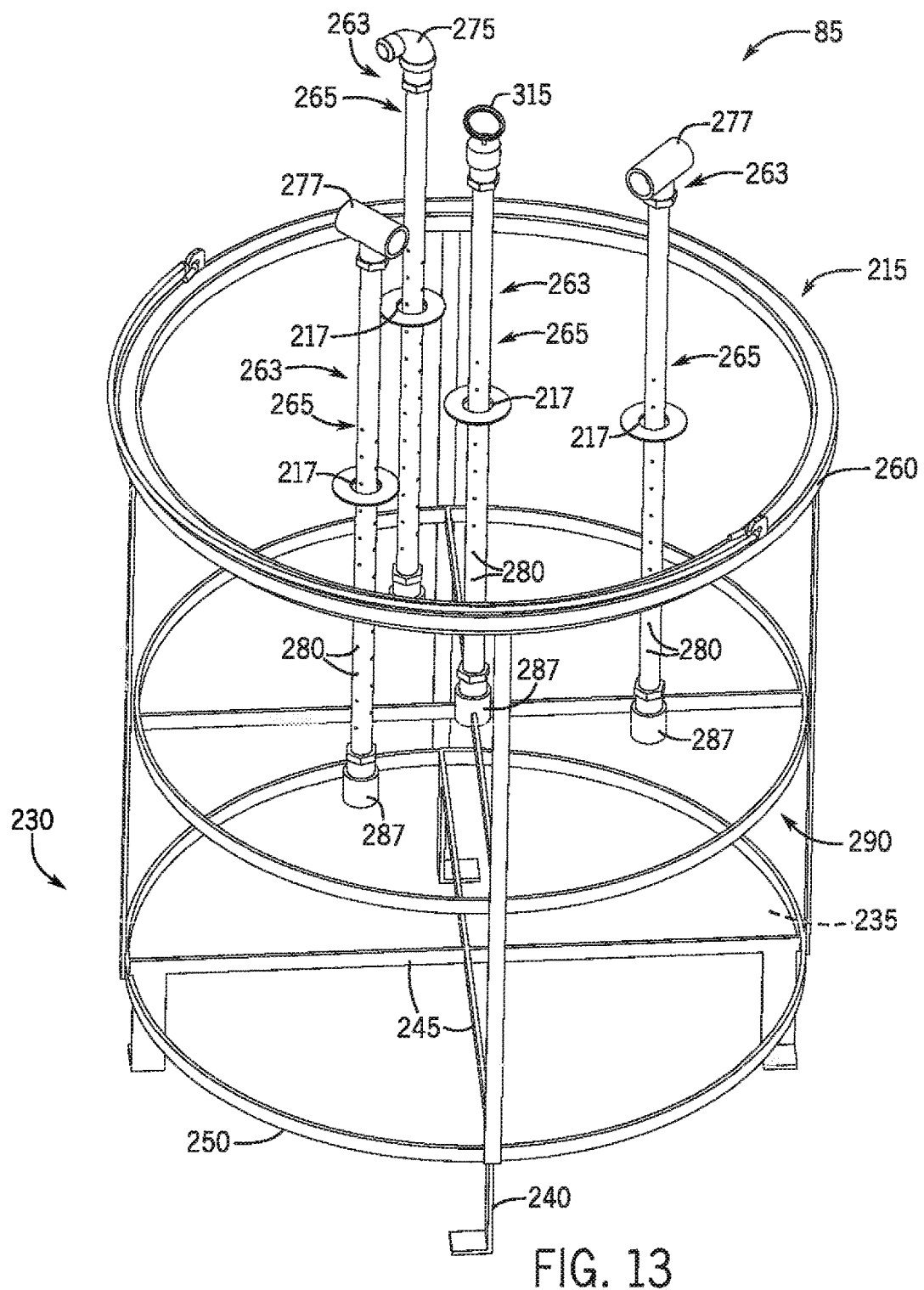
FIG. 13 is a pictorial view of various frame components of a variant of the infusion filter arrangement of FIG. 5.

Referring now to FIG. 13, infusion filter arrangement 85 is shown here without its perforated or mesh lower and side walls 220, 225 for ease of illustration of view of the various components and with multiple infusion tubes 265, instead of a single infusion tube 265, as shown in FIGS. 10-11. Each of the multiple infusion tubes 265 extends longitudinally into an intermediate segment of filter cavity 235 and may include various fittings such as elbow 275 and tee 277 to connect the infusion tubes 265 together or otherwise receive liquid by way of pieces of hose or tubing (not shown) or include or receive pieces of hardware, such as lift eye 315, to facilitate movement of false bottom 290. The infusion tubes 265 extend through corresponding multiple openings 217 of the filter cover 215 and are shown here generally vertical and spaced from and parallel to each other. One of the infusion tubes 265 is shown as a central tube that is generally coaxial with a longitudinal axis of the filter body 200, with the other infusion tubes 265 arranged concentrically between the central tube and the circumferential side wall 225 of the filter body 200. In this arrangement, each of the infusion tubes 265 delivers liquid such as water or wort in a radial outward direction from respective locations within the intermediate segment of filter cavity 235, for direct delivery inside of the grain bed.

Figure 14:
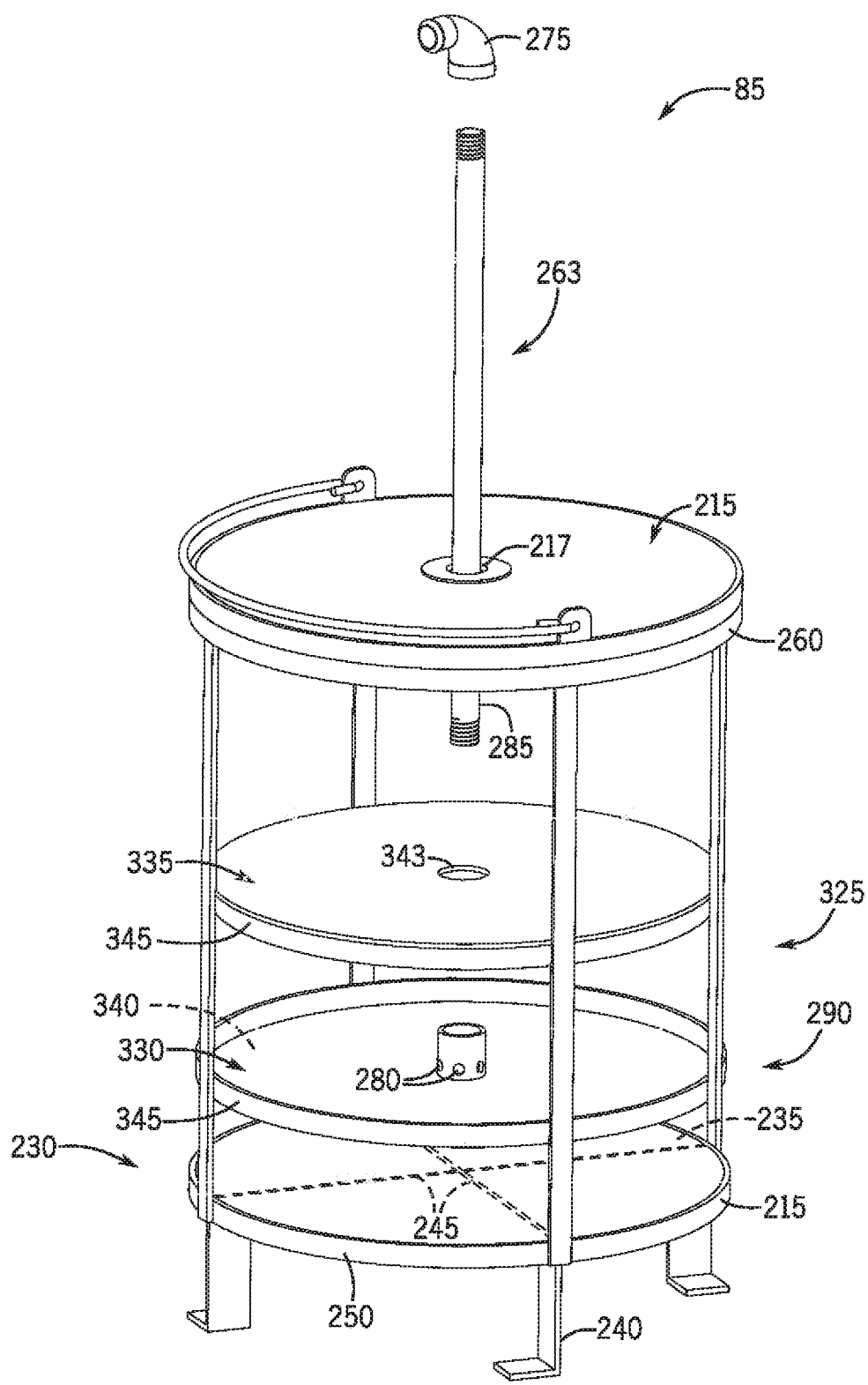
FIG. 14 is a pictorial view of various frame components of another variant of the infusion filter arrangement of FIG. 5.

Referring now to FIG. 14, infusion filter arrangement 85 is shown here without its perforated or mesh lower and side walls 220, 225 for ease of illustration of view of the various components. Delivery tube 263 is shown with a continuously solid side wall without outlets 280 so that the delivery tube 263 directs liquid such as water or wort toward the false bottom 290 without releasing the water or wort radially out like the infusion tube(s) 265 shown in FIGS. 10-11 and 13. In this way, the delivery tube 263 shown in FIG. 14 is a conduit that directs the water or wort downwardly through the intermediate segment of filter cavity 235 to deliver it into the false bottom 290, which directs the flow outwardly and upwardly through the grain bed, as explained in greater detail elsewhere herein.

Figure 15:
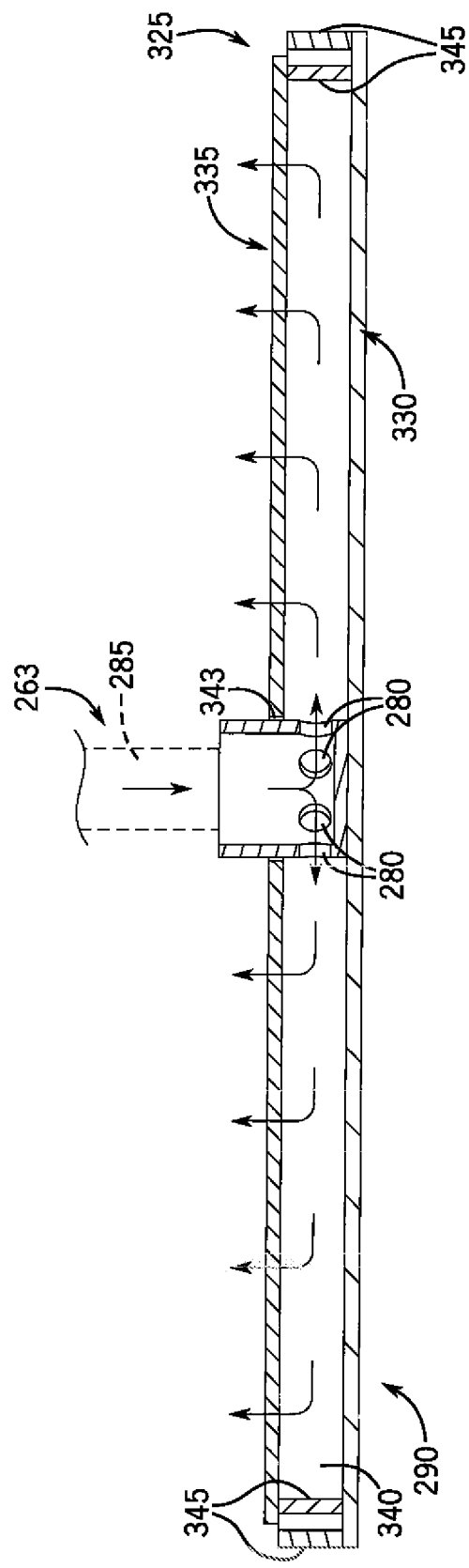
FIG. 15 is a cross-sectional view of a mash plate assembly such as of the type illustrated in FIG. 14.

Still referring to FIG. 14, the false bottom 290 shown here defines a mash plate assembly 325 that includes a solid bottom wall 330 and a perforated top wall 335 that are spaced from each other and define a mash plate assembly cavity 340 therebetween. Solid bottom wall 330 and perforated top wall 335 are held spaced from each other by cooperating hoop rings 345. A first hoop ring 345 extends in an axial direction from an outer perimeter of the solid bottom wall 330 and a second hoop ring that extends in an axial direction from an outer perimeter of the perforated top wall 335 toward the solid bottom wall 330. The hoop rings 345 of the solid bottom wall 330 and the perforated top wall 335 concentrically engage each other to provide a multilayered circumferential sidewall of the mash plate assembly 325 that cooperates with the solid bottom wall 330 to provide a flow directing arrangement that forces liquids flowing through the mash plate assembly cavity 340 upwardly out of the perforated top wall 335. The coupling 287 shown in FIG. 14 is connected to the solid bottom wall 330 and extends through opening 343 of perforated top wall 335. Coupling 287 receives a lower end 285 of the delivery tube 263 lower end 285 by way of threaded or other connection, so that the delivery tube 263 can define a lift element for lifting the false bottom 290. Coupling 287 is shown in FIG. 15 with outlets 280 arranged within the mash plate assembly cavity 340 to deliver the water or wort from the delivery tube 263 into the mash plate assembly cavity 340. In this way, the water or wort from the delivery tube 263 flows radially away from the delivery tube 263 and upwardly through the perforated top wall 335 and through the grain bed, as represented by the flow arrows in FIG. 15.

Figure 16:
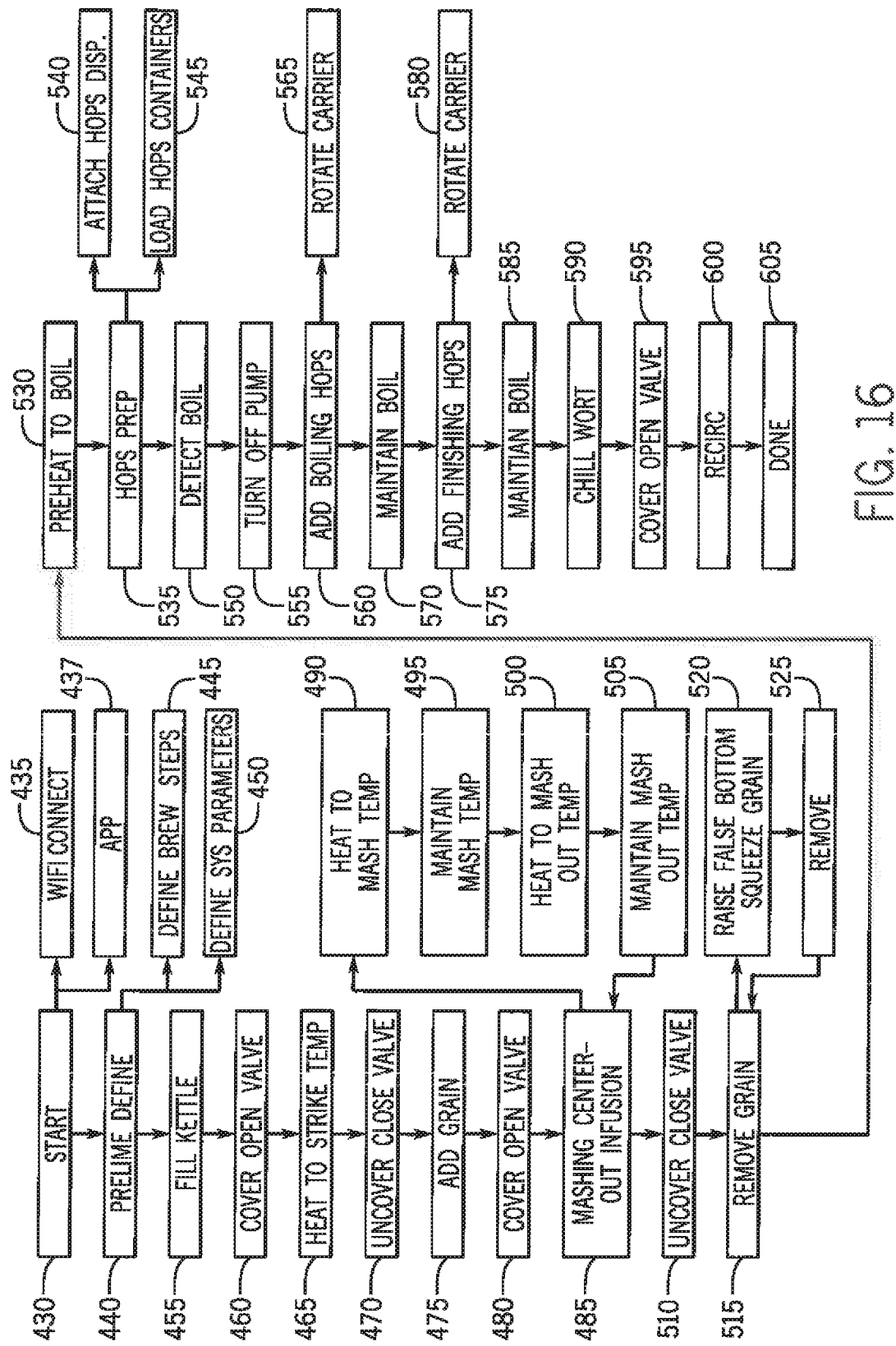
FIG. 16 is a flow chart of a method of using the automated beer brewing system incorporating the ingredient-dispensing arrangement of FIG. 1.

Referring now to the simplified schematic representation in FIG. 16, during use of system 5, an exemplary brewing process is represented by arrow 425. As represented at block 430, control system 100 is activated. Activation may include Wi-Fi connecting the control module 105 and control interface 110 and starting the application on the control interface 110, respectively, represented at blocks 435 and 437. Preliminary definitions are viewed and/or defined as represented at block 440. This includes defining brewing steps and system or operational parameters, as represented at blocks 445 and 450. The screen-capture images in FIGS. 17-18 show interfaces for viewing and defining brewing steps 445. The screen-capture image of FIG. 19 shows an interface for viewing and defining operational parameters 450. As represented at blocks 455 and 460 and with further reference to FIG. 1, kettle 10 is filled with water, shutoff valve 65 is opened, and cover 35 is placed on the kettle 10. As represented at blocks 465 and 470, control system 100 energizes the heating element(s) 55 to heat the water to a strike temperature, the shutoff valve 65 is closed, and the cover 35 is removed from kettle 10 when the strike temperature of the water is achieved. As represented at block 475, grain is added to the infusion filter arrangement 85. As represented at blocks 480 and 485, shutoff valve 65 is again opened and cover 35 is again placed on the kettle 10 and mashing begins. During mashing, center-out infusion is performed while circulating the contents with the recirculation system 70 by delivery of water/wort through infusion tube 265 from inside the filter cavity 235, radially outward through the filter cavity 235. As represented at blocks 490, 495, 500, 505, the contents are heated to a mash temperature, maintained at the mash temperature for a predetermined period of time, heated to a mash-out temperature, and maintained at the mash-out temperature for a predetermined period of time. As represented at blocks 410 and 415, the shutoff valve 65 is again closed, the cover 35 is again removed from kettle 10, and the grain is removed from the kettle 10. As represented at block 520, the grain is squeezed by raising the false bottom 290 to squeeze and press the grain between the false bottom 290 and the filter cover 215 and the infusion filter arrangement 85 is removed from the kettle 10 as represented at block 525. As represented at blocks 530 and 535, the contents are preheated for boiling and hops-adding preparations are made. This includes attaching the ingredient-dispensing arrangement 90 to the kettle 10 and loading hops into the tubes or containers 175 as represented at blocks 540 and 545. As represented at blocks 550 and 555, heating is maintained until boiling is achieved and detected, and the pump 80 is turned off. As represented at blocks 560 and 565, boiling hops are added by the control system 100 rotating the carrier plate 170 to align the respective container(s) 175 with the base plate opening 160. As represented at block 570, boiling is maintained for a predetermined period of time and the wort is chilled by adding chiller to the kettle 10. As represented at blocks 575 and 580, finishing hops are added by the control system 100 rotating the carrier plate 170 to align the respective container(s) 175 with the base plate opening 160. As represented at blocks 585 and 590, boiling is maintained for a predetermined period of time. As represented at block 590, shutoff valve 65 is again opened and cover 35 is again placed on the kettle 10. As represented at blocks 600 and 605, control system 100 energizes pump 80 and the contents are recirculated through the recirculation system 70 for a predetermined period of time and the process ends.

Figure 20:
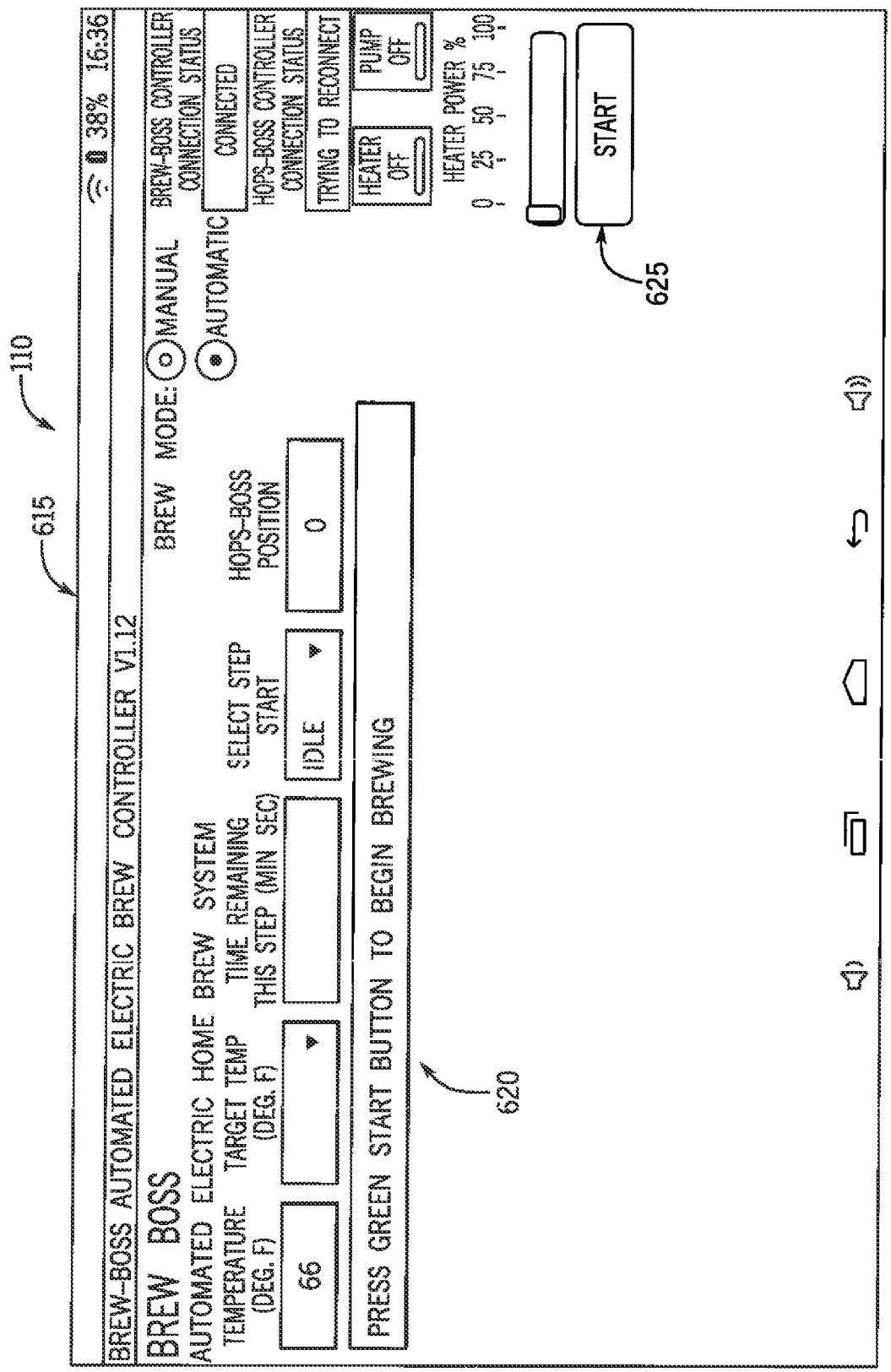
Figure 21:
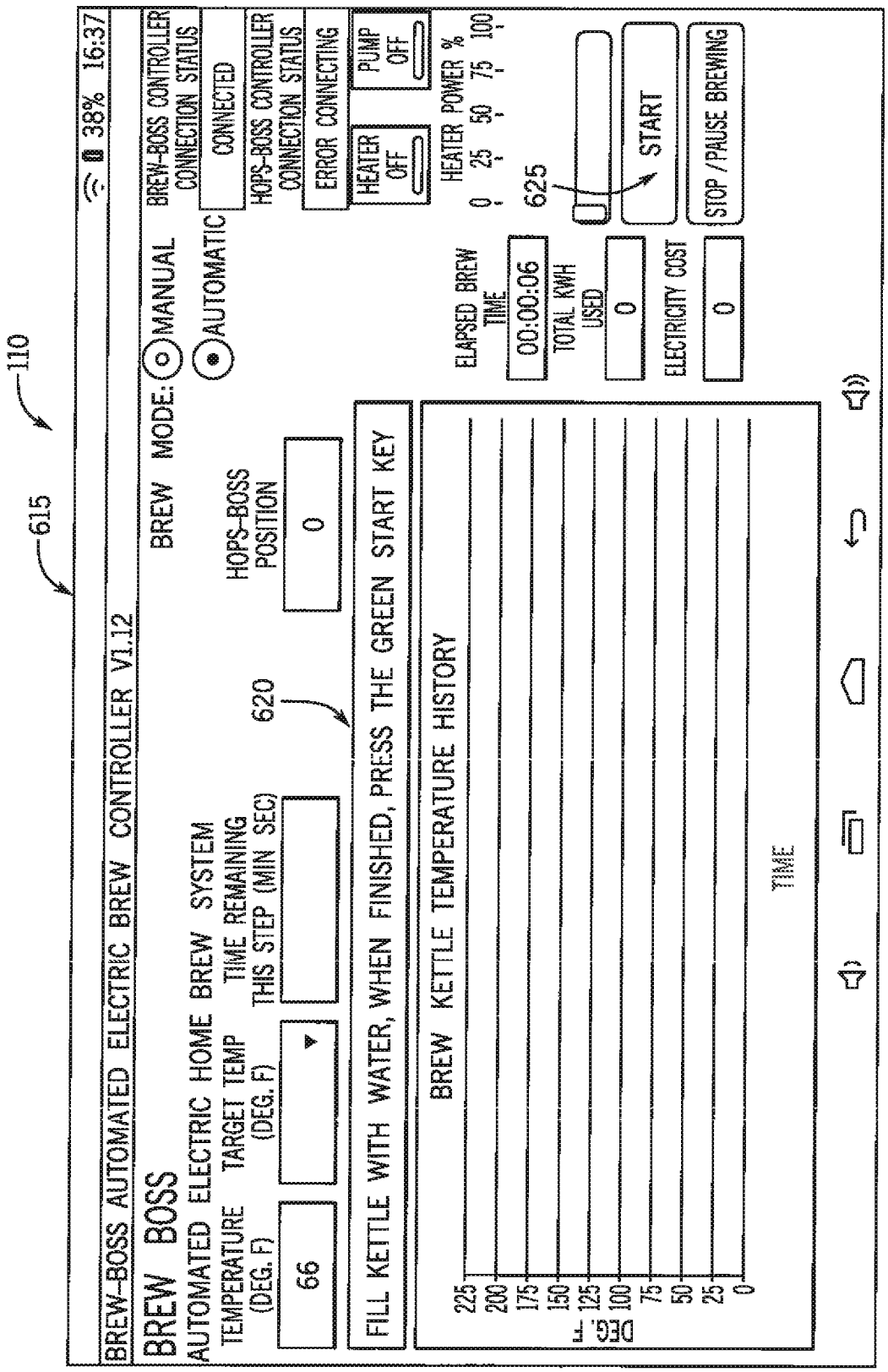
Figure 22:
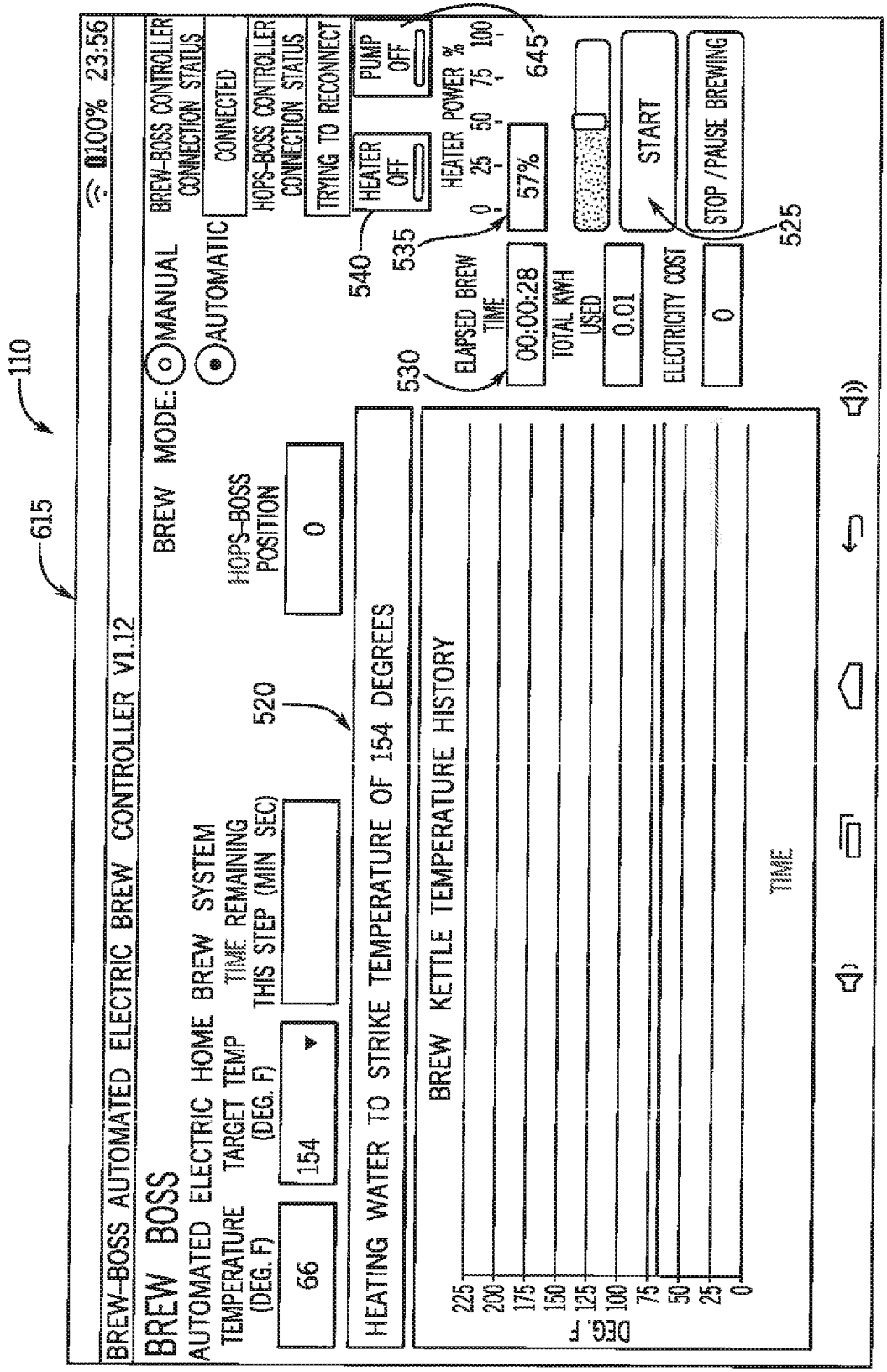
Figure 23:
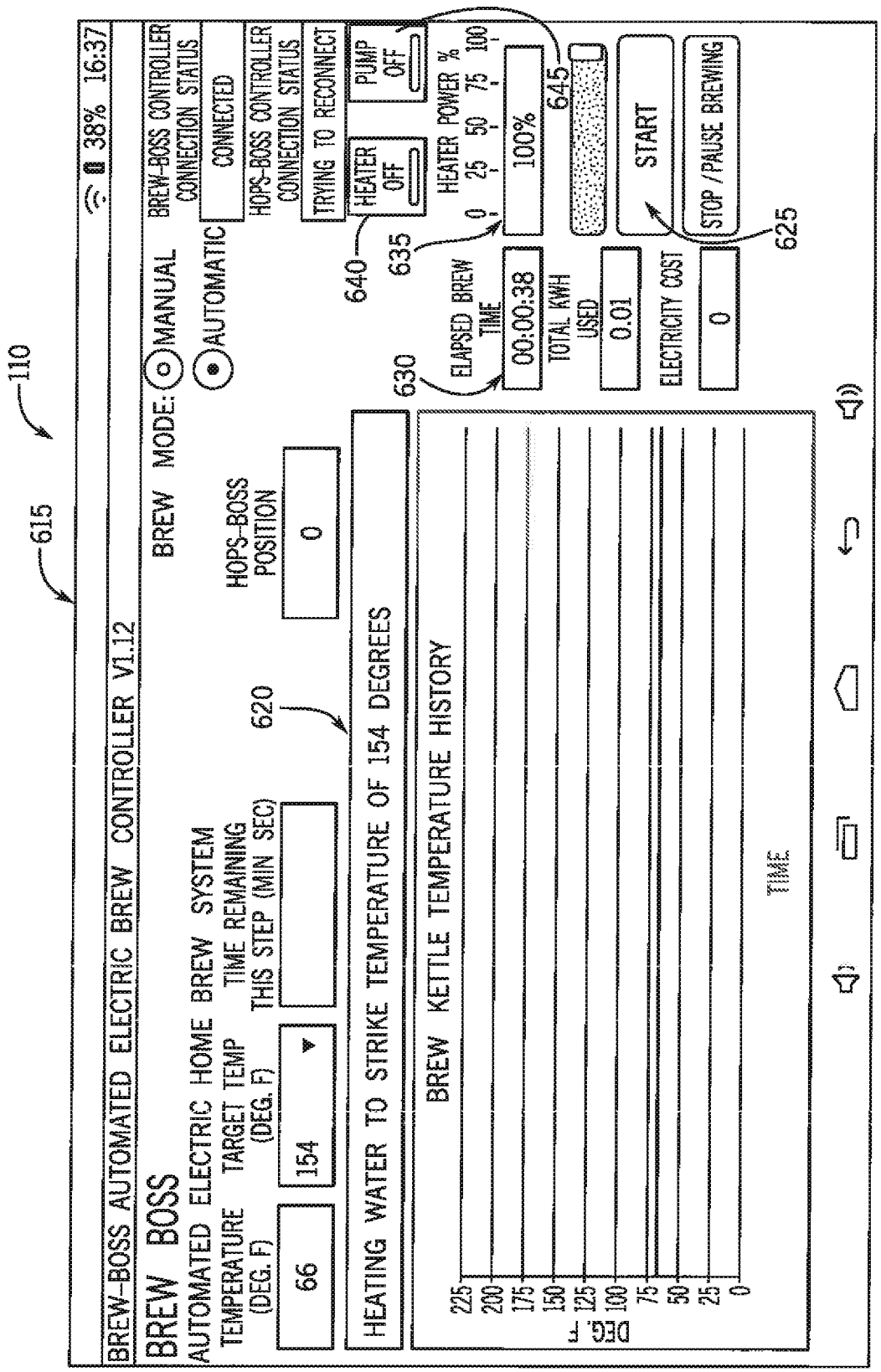
Figure 24:
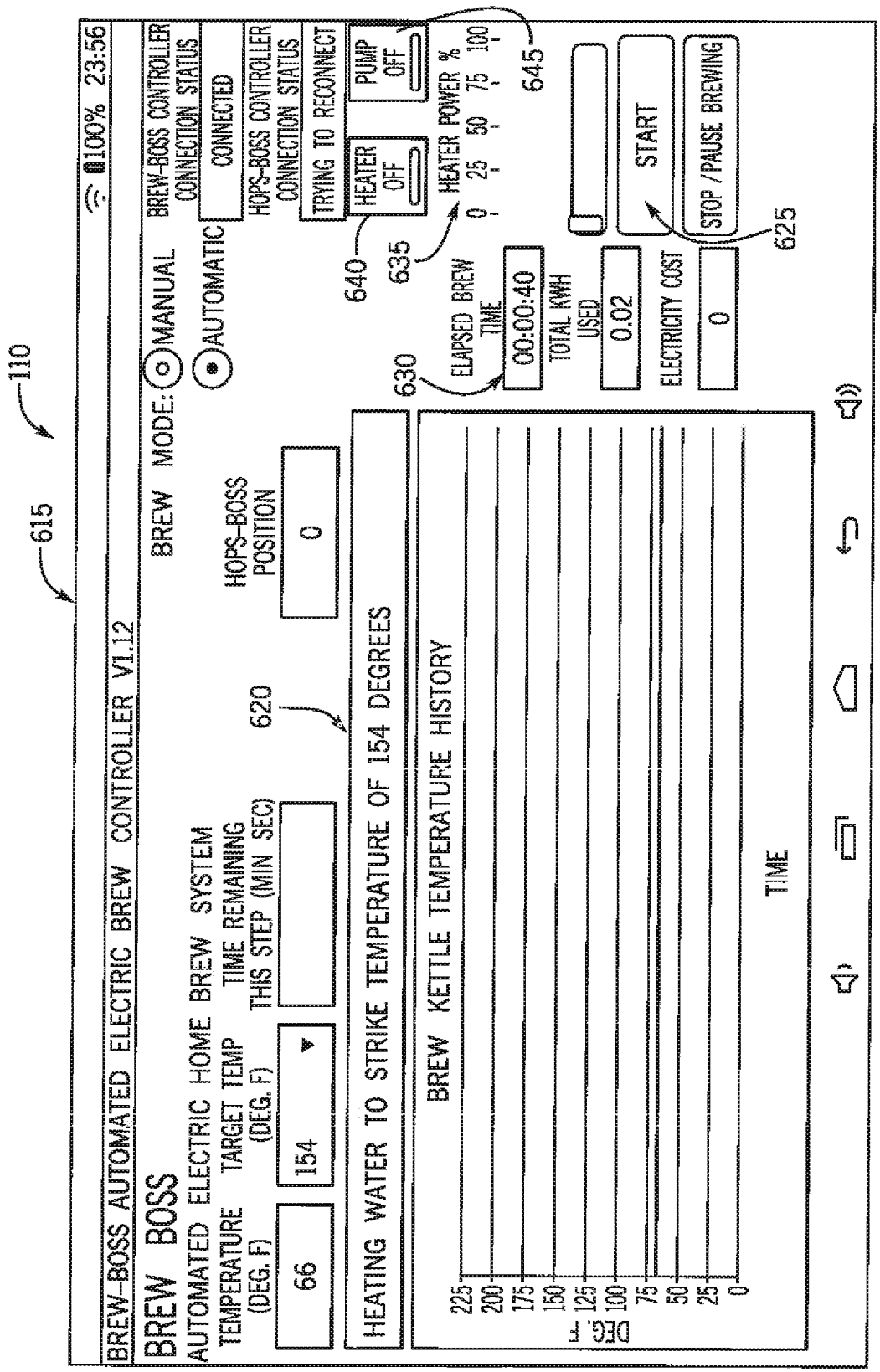
Figure 25:
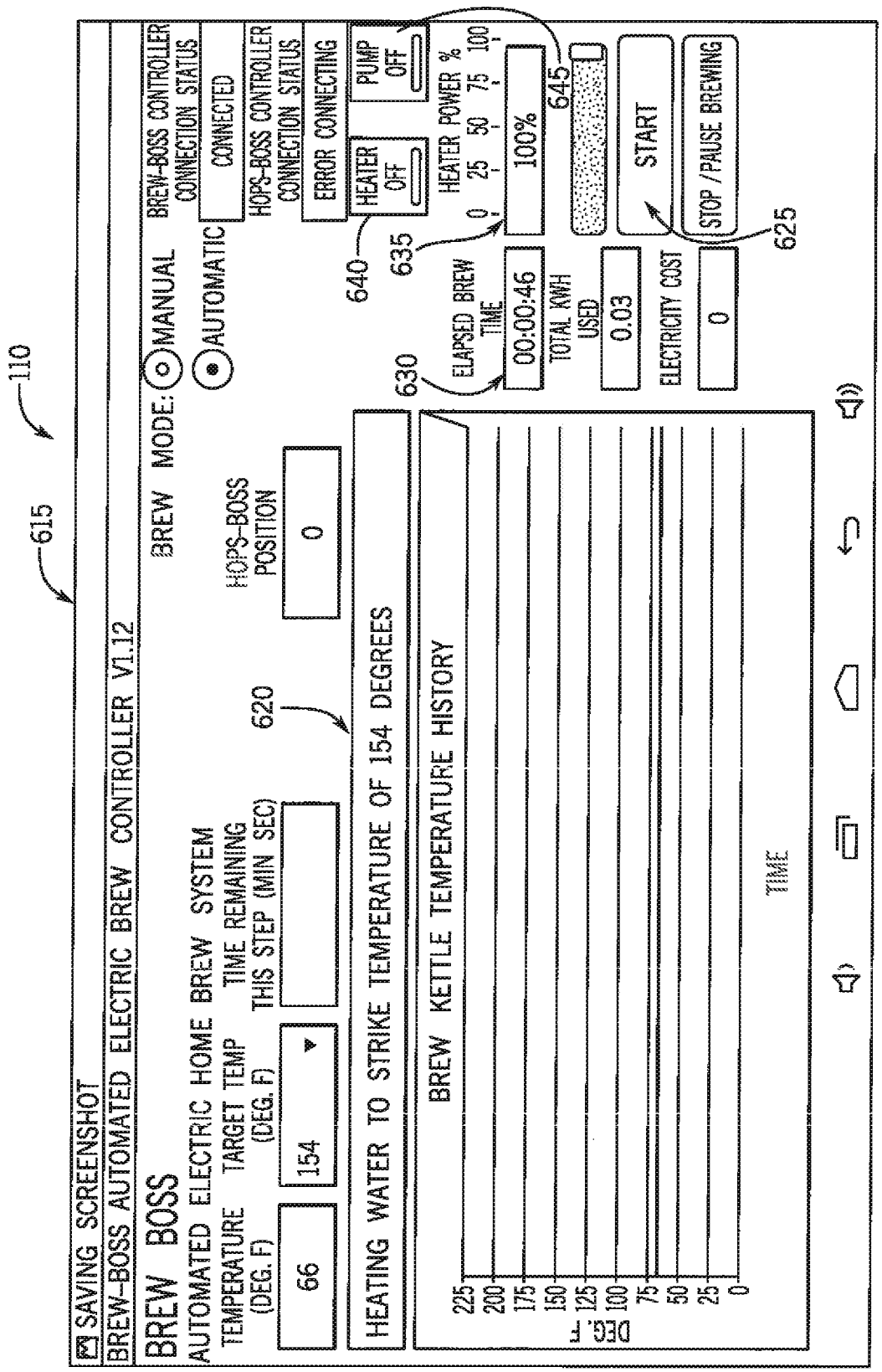

Referring now to FIGS. 20-25, various representations of screenshots are shown from a display 610 with a graphical user interface (GUI) 615 of the control interface 110. FIG. 20 shows the GUI 515 at a preliminary step with an information field 620 displaying that the process 425 (FIG. 16) can be started by pressing a start button 625. Information field 620 in FIG. 20 displays an instruction to fill kettle 10 with water and then press the start button 625. FIGS. 22-25 show the GUI 615 at different time periods within the step of heating to strike temperature 465 (FIG. 16), with the information field 620 displaying that the water is being heated to a strike temperature of 154°. FIG. 22 shows an elapsed time of 28 seconds in a timer field 630 with the power usage field 635 indicating 57% of heater power is being used, and heater and pump status indicators 640, 645 showing that the heater or heating element 55 and pump 80 (FIG. 1) are energized. FIG. 23 shows an elapsed time of 38 seconds in the timer field 530 with the power usage field 635 indicating 100% of heater power is being used, and heater and pump status indicators 640, 645 showing that the heating element 55 and pump 80 (FIG. 1) are energized. FIG. 24 shows an elapsed time of 40 seconds in the timer field 630 with the power usage field 635 indicating 0% of heater power is being used, and heater and pump status indicators 640, 645 showing that the heating element 55 and pump 80 (FIG. 1) are de-energized. FIG. 25 shows an elapsed time of 46 seconds in the timer field 630 with the power usage field 635 indicating 100% of heater power is being used, and heater and pump status indicators 640, 645 showing that the heating element 55 and pump 80 (FIG. 1) are energized.

Various alternatives and embodiments are contemplated as being within the scope of the following claims particularly pointing out and distinctly claiming the subject matter regarded as the invention.

I claim:

1. An infusion filter arrangement for use with a brewing kettle of a beer-brewing system, the infusion filter arrangement comprising:
   a filter body configured to be placed and maintained in a kettle cavity of the brewing kettle during a mash cycle and having perforated outer walls defining a filter cavity configured to hold grains defining a grain bed in the filter cavity during the mash cycle; and
   a forced infusion system including an infusion liquid delivery system configured to release water or wort out of the infusion liquid delivery system inside the filter cavity at an intermediate segment of the filter cavity and at a location relative to the grain bed for establishing a flow of the water or wort from the intermediate segment of the filter cavity radially outwardly through the grain bed that agitates the grains in the grain bed contained within the filter cavity.

2. The infusion filter arrangement of claim 1, wherein the infusion liquid delivery system includes a delivery tube that extends through the intermediate segment of the filter cavity and releases the water or wort relative to the intermediate segment of the grain bed to establish the flow of the water or wort radially outwardly through the grain bed.

3. The infusion filter arrangement of claim 2, wherein the delivery tube releases the water or wort at a location within the grain bed.

4. An infusion filter arrangement for use with a brewing kettle of a beer-brewing system, the infusion filter arrangement comprising:
   a filter body configured to be placed in the brewing kettle during a mash cycle and having perforated outer walls defining a filter cavity configured to hold grains defining a grain bed in the filter cavity during the mash cycle:
   a forced infusion system including an infusion liquid delivery system configured to release water or wort out of the infusion liquid delivery system at a location relative to the grain bed for establishing a flow of the water or wort through the grain bed that agitates the grains in the grain bed: and
   wherein the delivery tube defines an infusion tube extending longitudinally into the intermediate segment of the filter cavity, the infusion tube having an inlet receiving water or wort during the mash cycle and multiple outlets facing multiple directions delivering water or wort out of the infusion tube from the intermediate segment of the filter cavity outwardly through the filter cavity during the mash cycle, wherein the infusion tube establishes an inside to outside flow direction of the water or wort through the filter body during the mash cycle.

5. The infusion filter arrangement of claim 4, wherein the infusion tube is arranged generally vertically within the filter cavity, and wherein the inlet of the infusion tube is arranged at an upper end of the infusion tube, and the multiple outlets are arranged at different heights upon, and are faced radially away from, the infusion tube.

6. The infusion filter arrangement of claim 5, wherein the infusion tube is one of multiple infusion tubes that extend longitudinally into the intermediate segment of the filter cavity.

7. The infusion filter arrangement of claim 6, wherein each of the multiple infusion tubes is arranged generally vertically within the filter cavity.

8. The infusion filter arrangement of claim 2, wherein the delivery tube releases the water or wort at a location below the grain bed for delivery upwardly through the grain bed.

9. An infusion filter arrangement for use with a brewing kettle of a beer-brewing system, the infusion filter arrangement comprising:
   a filter body configured to be placed in the brewing kettle during a mash cycle and having perforated outer walls defining a filter cavity configured to hold grains defining a grain bed in the filter cavity during the mash cycle;
   a forced infusion system including an infusion liquid delivery system configured to release water or wort out of the infusion liquid delivery system at a location relative to the grain bed for establishing a flow of the water or wort through the grain bed that agitates the grains in the grain bed;
   wherein the infusion liquid delivery system includes a delivery tube that extends through an intermediate segment of the filter cavity and releases the water or wort relative to the intermediate segment of the grain bed to establish the flow of the water or wort through the grain bed; and
   wherein the delivery tube is configured to deliver the water or wort through multiple outlets arranged at a location below the grain bed for delivery upwardly through the grain bed.

10. The infusion filter arrangement of claim 9, further comprising a coupling arranged at an end of the delivery tube and wherein the multiple outlets are arranged at the coupling with the outlets facing radially away from the delivery tube.

11. The infusion filter arrangement of claim 8, further comprising a mash plate assembly arranged below the grain bed within the filter cavity of the filter body and wherein the water or wort is delivered out of the delivery tube at the mash plate assembly.

12. The infusion filter arrangement of claim 11, wherein the mash plate assembly includes a solid bottom wall and a perforated top wall spaced from the bottom wall with a mash plate assembly cavity defined between the solid bottom wall and the perforated top wall, and wherein the water or wort is released from the delivery tube into the mash plate assembly cavity and is directed through the perforated top wall and through the grain bed.

13. The infusion filter arrangement of claim 12, further comprising a coupling arranged at an end of the delivery tube, wherein the coupling has multiple outlets that face radially away from the delivery tube and are arranged in the mash plate assembly cavity.

14. A beer-brewing system, comprising:
a brewing kettle;
a heating system for heating the brewing kettle;
a recirculation system for moving liquid contents through the brewing kettle;
an infusion filter arrangement for delivering water or wort within the brewing kettle, the infusion filter arrangement including:
a filter body configured to be placed and maintained in a kettle cavity of the brewing kettle during a mash cycle and having perforated outer walls defining a filter cavity configured to hold grains defining a grain bed in the filter cavity during the mash cycle; and
a delivery tube extending through an intermediate segment of the filter cavity for directing water or wort into the brewing kettle, the delivery tube having at least one opening facing radially outward from the delivery tube and configured to release the water or wort relative to the intermediate segment of the grain bed to establish the flow of the water or wort from the intermediate segment of the filter cavity radially outwardly through and agitating the grain bed contained within the filter cavity.

15. A beer-brewing system, comprising:
a brewing kettle;
a heating system for heating the brewing kettle;
a recirculation system for moving liquid contents through the brewing kettle;
an infusion filter arrangement for delivering water or wort within the brewing kettle, the infusion filter arrangement including:
a filter body configured to be placed in the brewing kettle during a mash cycle and having perforated outer walls defining a filter cavity configured to hold grains defining a grain bed in the filter cavity during the mash cycle;
a delivery tube extending through an intermediate segment of the filter cavity for directing water or wort into the brewing kettle, the delivery tube configured to release the water or wort relative to the intermediate segment of the grain bed to establish the flow of the water or wort through the grain bed; and
wherein the delivery tube defines an infusion tube extending into an intermediate segment of the filter cavity and has multiple outlets facing multiple directions delivering water or wort out of the infusion tube from the intermediate segment of the filter cavity outwardly through the filter cavity during a mash cycle.

16. The beer-brewing system of claim 15, wherein the infusion tube is one of multiple infusion tubes that extend longitudinally into the intermediate segment of the filter cavity.

17. A beer-brewing system, comprising:
a brewing kettle;
a heating system for heating the brewing kettle;
a recirculation system for moving liquid contents through the brewing kettle;
an infusion filter arrangement for delivering water or wort within the brewing kettle, the infusion filter arrangement including:
a filter body configured to be placed in the brewing kettle during a mash cycle and having perforated outer walls defining a filter cavity configured to hold grains defining a grain bed in the filter cavity during the mash cycle;
a delivery tube extending through an intermediate segment of the filter cavity for directing water or wort into the brewing kettle, the delivery tube configured to release the water or wort relative to the intermediate segment of the grain bed to establish the flow of the water or wort through the grain bed; and
wherein the delivery tube extends to a mash plate assembly that includes a solid bottom wall and a perforated top wall spaced from the bottom wall with a mash plate assembly cavity defined between the solid bottom wall and the perforated top wall, and wherein the water or wort is released from the delivery tube into the mash plate assembly cavity and is directed through the perforated top wall and through the grain bed.

* * * * *